United States Patent
Yoshida

(10) Patent No.: US 6,280,008 B1
(45) Date of Patent: Aug. 28, 2001

(54) BRAKE FORCE CONTROL APPARATUS

(75) Inventor: Hiroaki Yoshida, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/171,587

(22) PCT Filed: Apr. 24, 1997

(86) PCT No.: PCT/JP97/01437

§ 371 Date: Oct. 21, 1998

§ 102(e) Date: Oct. 21, 1998

(87) PCT Pub. No.: WO97/41019

PCT Pub. Date: Nov. 6, 1997

(30) Foreign Application Priority Data

Apr. 26, 1996 (JP) ................................... 8-108104

(51) Int. Cl.$^7$ ..................................... B60T 8/60

(52) U.S. Cl. ..................... 303/155; 303/113.4; 303/139; 303/113.2; 303/122

(58) Field of Search .................... 303/158, 139, 303/186, 113.5, 113.2, 195, 196, 194, 113.4, 155, 122, 122.09, 122.03, 122.04, 122.05, 122.06, 192

(56) References Cited

U.S. PATENT DOCUMENTS

| 5,158,343 | 10/1992 | Reichelt et al. . |
| 5,261,730 | * 11/1993 | Steiner et al. ..................... 303/113.4 |
| 5,350,225 | 9/1994 | Steiner et al. . |
| 5,367,942 | 11/1994 | Nell et al. . |
| 5,427,442 | 6/1995 | Heibel . |

(List continued on next page.)

FOREIGN PATENT DOCUMENTS

| 0711695 | 5/1996 | (EP) . |
| 2282649 | 4/1995 | (GB) . |
| 2295209 | 5/1996 | (GB) . |
| 61-268560 | 11/1986 | (JP) . |
| 3-227766 | 10/1991 | (JP) . |
| 4-121260 | 4/1992 | (JP) . |
| 5-97022 | 4/1993 | (JP) . |
| 07-156789 | 6/1995 | (JP) . |
| 07-165051 | 6/1995 | (JP) . |
| 7-329766 | 12/1995 | (JP) . |
| 8-34326 | 2/1996 | (JP) . |
| 8-40229 | 2/1996 | (JP) . |
| 8-295224 | 11/1996 | (JP) . |
| 9-76901 | * 3/1997 | (JP) ................................. 303/122.05 |
| WO95/6763 | 3/1996 | (WO) . |

OTHER PUBLICATIONS

Copending U.S. application No. 09/155,769, filed Oct. 2, 1998.

Copending U.S. application No. 09/171,498, filed Oct. 20, 1998.

(List continued on next page.)

*Primary Examiner*—Robert J. Oberleitner
*Assistant Examiner*—Devon Kramer
(74) *Attorney, Agent, or Firm*—Kenyon & Kenyon

(57) ABSTRACT

A brake force control apparatus is provided that performs a brake assist control in which a brake force larger than that of a normal time is generated when an emergency braking is required in a vehicle, and prevents a change in a driving stability when an abnormality occurs in a vehicle characteristic changing control for maintaining the driving stability of the vehicle. When an abnormality is detected (steps 102, 106–114) in one of the vehicle characteristic changing controls, an increasing slope of a brake force of rear wheels is decreased (step 104) in the brake assist control. Alternatively, the brake assist control may be prohibited (step 140).

7 Claims, 9 Drawing Sheets

U.S. PATENT DOCUMENTS

| | | |
|---|---|---|
| 5,445,444 | 8/1995 | Rump et al. . |
| 5,492,397 | 2/1996 | Steiner et al. . |
| 5,496,099 | 3/1996 | Resch . |
| 5,499,866 | 3/1996 | Brugger et al. . |
| 5,513,906 | 5/1996 | Steiner . |
| 5,520,448 * | 5/1996 | Okubo ............... 303/148 |
| 5,535,123 | 7/1996 | Rump et al. . |
| 5,549,369 | 8/1996 | Rump et al. . |
| 5,556,173 | 9/1996 | Steiner et al. . |
| 5,564,797 | 10/1996 | Steiner et al. . |
| 5,567,021 | 10/1996 | Gaillard . |
| 5,584,542 | 12/1996 | Klarer et al. . |
| 5,586,814 | 12/1996 | Steiner . |
| 5,658,055 | 8/1997 | Dieringer et al. . |
| 5,660,448 | 8/1997 | Kiesewetter et al. . |
| 5,669,676 | 9/1997 | Rump et al. . |
| 5,719,769 | 2/1998 | Brugger et al. . |
| 5,720,532 | 2/1998 | Steiner et al. . |
| 5,772,290 | 6/1998 | Heibel et al. . |
| 5,924,776 * | 7/1999 | Kimura et al. ............ 303/122.05 |
| 5,941,614 * | 8/1999 | Gallery et al. ............ 303/192 |

OTHER PUBLICATIONS

Copending U.S. application No. 09/171,588, filed Oct. 21, 1998.

Copending U.S. application No. 09/171,587, filed Oct. 21, 1998.

Copending U.S. application No. 09/171,589, filed Oct. 21, 1998.

Copending U.S. application No. 09/171,644, filed Oct. 22, 1998.

Copending U.S. application No. 09/171,645, filed Oct. 22, 1998.

Copending U.S. application No. 09/180,014, filed Oct. 29, 1998.

Copending U.S. application No. 09/194,136, filed Nov. 25, 1998.

Copending U.S. application No. 09/108,007, filed Jun. 30, 1998.

Copending U.S. application No. 09/107,771, filed Jul. 2, 1998.

Copending U.S. application No. 09/171,582, filed Oct. 21, 1998.

Copending U.S. application No. 09/171,507, filed Oct. 21, 1998.

* cited by examiner

BRAKE FORCE CONTROL APPARATUS

TECHNICAL FIELD

The present invention relates to a. brake force control apparatus and, more particularly, to a brake force control apparatus which generates, when an emergency braking is required, a brake force greater than that generated in an ordinary time.

BACKGROUND ART

Conventionally, for example, as disclosed in Japanese Laid-Open Patent Application 4-121260, a brake force control apparatus which generates, when an emergency braking is required, a brake force greater than that generated in a normal time is known. The above-mentioned conventional apparatus comprises a control circuit which generates a drive signal corresponding to an operational speed of a brake pedal and a fluid pressure generating mechanism which generates a brake fluid pressure corresponding to the drive signal generated by the control circuit.

The control circuit determines that, when an operational speed of a brake pedal is less than a predetermined value, the brake pedal is not normally operated. In this case, the fluid pressure generating mechanism is controlled so that a brake fluid pressure corresponding to a brake pressing force is generated. Hereinafter, this control is referred to as a normal control. Additionally, the control circuit determines that, when an operational force of the brake pedal exceeds a predetermined value, an emergency braking is required by the driver. In this case, the fluid pressure generating mechanism is controlled so that a brake fluid pressure is maximized. Hereinafter, this control is referred to as a brake assist control. Thus, according to the above-mentioned conventional apparatus, a brake force corresponding to a brake pressing force can be generated in a normal time, and a large brake force can be immediately generated in an emergency. Thereby, an emergency braking can be performed and a rapid braking can be achieved even if the driver intends to perform an emergency braking but is unable to hold a large pressing force applied to a brake pedal.

Conventionally, in order to improve a driving stability, apparatuses for a vehicle which perform an antilock brake control (hereinafter, referred to as an ABS control), a vehicle stability control (hereinafter, referred to as ASC), a traction control (hereinafter, referred to as TRC) or a suspension attenuation force control are known. These apparatuses control a distribution of braking and driving forces, a distribution of rolling rigidity, a posture, and a distribution of a load to each wheel so as to improve a driving stability of the vehicle with respect to changes in a moving condition or a driving condition of the vehicle. Hereinafter, such an apparatus which improves a driving stability of a vehicle is referred to as a vehicle characteristic changing apparatus. By the above-mentioned conventional brake force control apparatus is provided to a vehicle together with the vehicle characteristic changing apparatus, a rapid braking can be achieved by performing a brake assist control and an improvement of a driving stability of a vehicle can be achieved so that safety of the vehicle is greatly improved.

However, in the vehicle having the above-mentioned vehicle characteristic changing apparatus, when an abnormality occurs in the vehicle characteristic changing apparatus, a driving stability is changed as compared to that of a normal time. Additionally, in the vehicle having the above-mentioned vehicle characteristic changing apparatus, when the brake assist control is performed as an emergency braking is required, a side force which can be generated by the vehicle is decreased and the driving stability is changed since a large brake force is generated rapidly. Accordingly, In the vehicle having both the above-mentioned vehicle characteristic changing apparatus and the brake force control apparatus, when the brake assist control is performed by the above-mentioned brake force control apparatus under a condition in which the vehicle characteristic changing apparatus malfunctions, an amount of change of a driving stability is increased as compared to a case in which the vehicle characteristic changing apparatus is normal and before the brake assist control is performed.

DISCLOSURE OF INVENTION

It is an object of the present invention to provide an improved and useful brake force control apparatus in which the above-mentioned problems are eliminated.

A more specific object of the present invention is to provide a brake force control apparatus which can minimize a change in a driving stability of a vehicle when a vehicle characteristic changing apparatus malfunctions.

In order to achieve the above-mentioned objects, there is provided according to one aspect of the present invention a brake force control apparatus adapted to be provided on a vehicle having a vehicle characteristic changing apparatus for controlling a driving stability of the vehicle, the brake force control apparatus performing a normal control for generating a brake force corresponding to a brake pressing force and a brake assist control for generating a brake force larger than that of the normal control when an operational state of a brake pedal satisfies a predetermined condition, characterized by:

pressure increasing slope controlling means for decreasing an increasing slope of a brake force of at least rear wheels among front and rear wheels of the vehicle when the brake assist control is performed and if an abnormality occurs in the vehicle characteristic changing apparatus.

In the present invention, the vehicle characteristic changing apparatus controls a driving stability of a vehicle. Accordingly, if an abnormality occurs in the vehicle characteristic changing apparatus, the driving stability of the vehicle is changed. If the brake assist control performed in such a case, a brake force is increased, and, thereby, a degree of change in the driving stability is further increased. When the brake force is increased, the rear wheels are easily locked as compared to the front wheels. In the present invention, when an abnormality occurs in the vehicle characteristic changing apparatus, an increasing slope of a brake force when the brake assist control is performed is decreased by the pressure increasing slope controlling means for at least the rear wheels which are easily locked. Accordingly, when an abnormality occurs in the vehicle characteristic changing apparatus, a change in the driving stability of the vehicle due to the execution of the brake assist control is suppressed.

According to the above-mentioned invention, when an abnormality occurs in the vehicle characteristic changing apparatus, a change in the driving stability of the vehicle due to the execution of the brake assist control can be suppressed while obtaining a brake effect according to the brake assist control by decreasing an increasing slope of the rear wheels when the brake assist control is performed.

Additionally, there is provided according to another aspect of the present invention a brake force control apparatus adapted to be provided on a vehicle having a vehicle characteristic changing apparatus for controlling a driving stability of the vehicle, the brake force control apparatus performing a normal control for generating a brake force corresponding to a brake pressing force and a brake assist control for generating a brake force larger than that of the normal control when an operational state of a brake pedal satisfies a predetermined condition, characterized by:

control prohibiting means for prohibiting an execution of the brake assist control when an abnormality occurs in the vehicle characteristic changing apparatus.

In this invention, the vehicle characteristic changing apparatus controls a driving stability of a vehicle. Accordingly, if an abnormality occurs in the vehicle characteristic changing apparatus, the driving stability of the vehicle is changed. If the brake assist control performed in such a case, a brake force is increased, and, thereby, a degree of change in the driving stability is further increased. In the present invention, when an abnormality occurs in the vehicle characteristic changing apparatus, an execution of the brake assist control is prohibited by the control prohibiting means. Accordingly, when an abnormality occurs in the vehicle characteristic changing apparatus, a change in the driving stability of the vehicle due to the execution of the brake assist control is prevented.

Additionally, there is provided according to another aspect of the present invention a brake force control apparatus adapted to be provided on a vehicle having a vehicle characteristic changing apparatus for controlling a driving stability of the vehicle by controlling a brake force, the brake force control apparatus performing a normal control for generating a brake force corresponding to a brake pressing force and a brake assist control for generating a brake force larger than that of the normal control when an operational state of a brake pedal satisfies a predetermined condition, characterized by:

control prohibiting means for prohibiting an execution of the brake assist control when an abnormality occurs in the vehicle characteristic changing apparatus.

In this invention, the vehicle characteristic changing apparatus controls a driving stability of a vehicle by controlling a brake force. Accordingly, if an abnormality occurs in the vehicle characteristic changing apparatus, the brake force is not appropriately controlled, and the driving stability is changed. If the brake assist control is performed in such a case, a brake force is increased, and, thereby, a degree of change in the driving stability is further increased. In the present invention, when an abnormality occurs in the vehicle characteristic changing apparatus, an execution of the brake assist control is prohibited by the control prohibiting means. Accordingly, when an abnormality occurs in the vehicle characteristic changing apparatus, a change in the driving stability of the vehicle due to the execution of the brake assist control is prevented.

There is provided according to another aspect of the present invention a brake force control apparatus adapted to be provided on a vehicle having a vehicle characteristic changing apparatus for controlling a driving stability of the vehicle, the brake force control apparatus performing a normal control for generating a brake force corresponding to a brake pressing force and a brake assist control for generating a brake force larger than that of the normal control when an operational state of a brake pedal satisfies a predetermined condition, characterized by:

brake assist control terminating means for terminating an execution of the brake assist control when an abnormality occurs in the vehicle characteristic changing apparatus during the execution of the brake assist control.

There is provided according to another aspect of the present invention a brake force control apparatus adapted to be provided on a vehicle having a plurality of vehicle characteristic changing apparatuses for controlling a driving stability of the vehicle, the brake force control apparatus performing a normal control for generating a brake force corresponding to a brake pressing force and a brake assist control for generating a brake force larger than that of the normal control when an operational state of a brake pedal satisfies a predetermined condition, characterized by:

brake assist control terminating means for terminating an execution of the brake assist control when an abnormality occurs in the vehicle characteristic changing apparatuses associated with a control of a brake force during the execution of the brake assist control; and pressure increasing slope controlling means for decreasing (step 104) an increasing slope of a brake force of at least rear wheels among front and rear wheels of the vehicle when an abnormality occurs in the vehicle characteristic changing apparatuses other than that associated with the control of the brake force.

Additionally, there is provided according to another aspect of the present invention a brake force control apparatus adapted to be provided on a vehicle having a vehicle characteristic changing apparatus for controlling a driving stability of the vehicle, the brake force control apparatus performing a normal control for generating a brake force corresponding to a brake pressing force and a brake assist control for generating a brake force larger than that of the normal control when an operational state of a brake pedal satisfies a predetermined condition, characterized by:

abnormality detecting means for detecting an abnormality of the vehicle characteristic changing apparatus;

brake assist control start determining means for determining a start of an execution of the brake assist control; and pressure increasing slope controlling means for decreasing an increasing slope of a brake force of at least rear wheels among front and rear wheels of the vehicle when an abnormality of the vehicle characteristic changing apparatus is detected and when the brake assist control is started.

Further, there is provided according to another aspect of the present invention a brake force control apparatus adapted to be provided on a vehicle having a plurality of vehicle characteristic changing apparatuses for controlling a driving stability of the vehicle, the brake force control apparatus performing a normal control for generating a brake force corresponding to a brake pressing force and a brake assist control for generating a brake force larger than that of the normal control when an operational state of a brake pedal satisfies a predetermined condition, characterized by:

abnormality detecting means for detecting an abnormality of each of the vehicle characteristic changing apparatus;

brake assist control start determining means for determining a start of an execution of the brake assist control; and pressure increasing slope controlling means for decreasing an increasing slope of a brake force of at least rear wheels among front and rear wheels of the vehicle when an abnormality is detected in the vehicle characteristic changing apparatuses other than that associated with a control of the brake force and when the brake assist control is started.

Other objects, features and advantages of the present invention will become more apparent from the following detailed description when read in conjunction with the accompanying drawings.

BEST MODE FOR CARRYING OUT THE INVENTION

Figure 1:
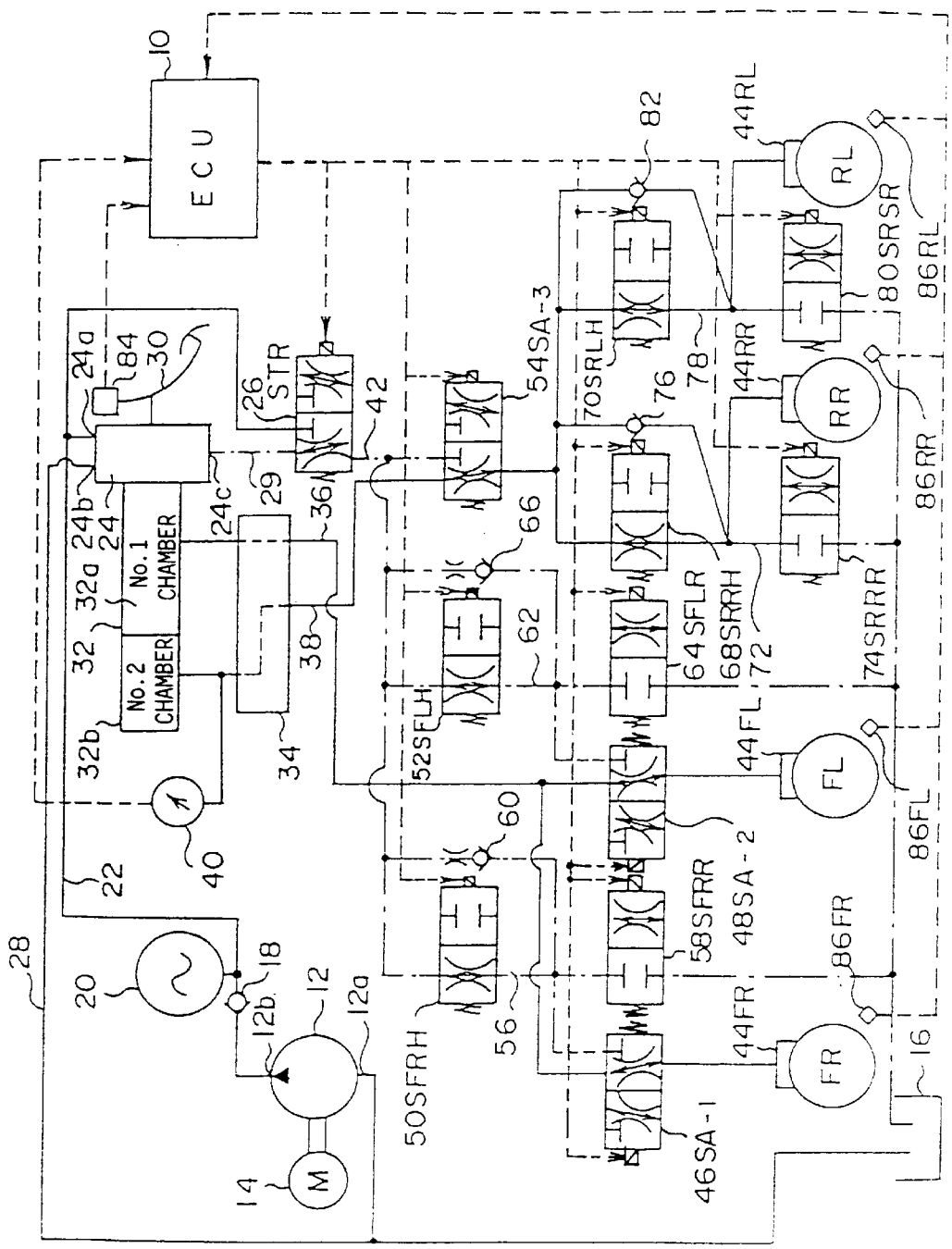
FIG. 1 is a system structure diagram of a brake force control apparatus according to an embodiment of the present invention.

FIG. 1 is a system structure diagram of a brake force control apparatus according to an embodiment of the present invention. The brake force control apparatus shown in FIG. 1 is controlled by an electronic control unit 10 (hereinafter, referred to as ECU 10). The brake force control apparatus comprises a pump 12. The pump 12 has a motor 14 as a power source thereof. An inlet port 12a of the pump 12 communicates with a reservoir tank 16. An accumulator 20 communicates with an outlet port 12b of the pump via a check valve 18. The pump 12 delivers brake fluid in the reservoir tank 16 from the outlet port 12b so that a predetermined pressure is always accumulated in the accumulator 20.

The accumulator 20 communicates with a high-pressure port 24a of a regulator 24 via a high-pressure passage 22, and communicates with a regulator switching solenoid 26 (hereinafter, referred to as STR 26). The regulator 24 has a low-pressure port 24b and a control fluid pressure port 24c. The low-pressure port 24b communicates with the reservoir tank 16 via a low-pressure passage 28. The control fluid pressure port 24c communicates with the STR 26 via a control fluid pressure passage 29. The STR 26 is a two-position solenoid valve which selectively set one of the control fluid pressure passage 29 and the high-pressure passage 22 in a conductive state, and sets the control fluid pressure passage 29 in a conductive state and sets the high-pressure passage in a closed state in a normal state. Hereinafter, the two-position solenoid valve means a solenoid valve which can be set to two states.

A brake pedal 30 is connected to the regulator 24, and a master cylinder is mounted to the regulator 24. The regulator 24 has a fluid pressure chamber therein. The fluid pressure chamber always communicates with the control fluid pressure port 24c, and selectively communicates with the high-pressure port 24a or the low-pressure port 24b in accordance with an operational state of a brake pedal 30. The regulator 24 is configured so that the pressure inside the fluid pressure chamber is adjusted to a fluid pressure corresponding to a brake pressing force $F_P$ exerted on the brake pedal 30. Accordingly, the fluid pressure corresponding to the brake pressing force $F_P$ always appears at the control fluid pressure port 24c of the regulator 24. Hereinafter, this fluid pressure is referred to as a regulator pressure $P_{RE}$.

The brake pressing force $F_P$ exerted on the brake pedal 30 is mechanically transmitted to a master cylinder 32 via the regulator 24. Additionally, a force corresponding to the fluid pressure inside the fluid pressure chamber of the regulator 24, that is, a force corresponding to the regulator pressure $P_{RE}$, is transmitted to the master cylinder 32.

The master cylinder 32 is provided with a first fluid pressure chamber 32a and a second fluid pressure chamber 32b therein. A master cylinder pressure $P_{M/C}$ corresponding to a resultant force of the brake pressing force $F_P$ and a brake assist force $F_A$ is generated in the first fluid pressure chamber 32a and the second fluid pressure chamber 32b. Both the master cylinder pressure $P_{M/C}$ generated in the first fluid pressure chamber 32a and the master cylinder pressure $P_{M/C}$ generated in the second fluid pressure chamber 32b are supplied to a proportioning valve 34 (hereinafter, referred to as P valve 34).

The P valve 34 communicates with a first fluid pressure passage 36 and a second fluid pressure passage 38. The P valve 34 supplies the master cylinder pressure $P_{M/C}$ to the first fluid pressure passage 36 and the second fluid pressure passage 38 without change in an area where the master cylinder pressure $P_{M/C}$ is less than a predetermined value. Additionally, the P valve 34 supplies the master cylinder pressure $P_{M/C}$ to the first fluid pressure passage 36 without change and supplies a fluid pressure obtained by decreasing the master cylinder pressure $P_{M/C}$ by a predetermined ratio to the second fluid pressure passage 38 in a range where the master cylinder pressure $P_{M/C}$ is less than a predetermined value.

A hydraulic pressure sensor 40, which outputs an electric signal corresponding the master cylinder pressure $P_{M/C}$, is provided to a passage between the second fluid pressure chamber 32b of the master cylinder 32 and the P valve 34. An output signal of the hydraulic pressure sensor 40 is supplied to the ECU 10. The ECU 10 detects the master cylinder pressure $P_{M/C}$ generated in the master cylinder 32 based on the output signal of the hydraulic pressure sensor 40.

The above-mentioned STR 26 communicates with a third fluid pressure passage 42. The third fluid pressure passage 42 communicates with one of the control fluid pressure passage 29 and the high-pressure passage 22 in accordance with a state of the STR 26. In the present embodiment, wheel cylinders 44FL and 44FR provided to left and right front wheels FL and FR are provided with a brake fluid pressure from the first fluid pressure passage 36 communicating with the P valve 34 or the third fluid pressure passage 42 communicating with the STR 26. Additionally, wheel cylinders 44RL and 44RR provided to left and right rear wheels RL and RR are provided with a brake fluid pressure from the second fluid pressure passage 38 communicating with the P valve 34 or the third fluid pressure passage 42 communicating with the STR 26.

The first fluid pressure passage 36 communicates with a first assist solenoid valve 46 (hereinafter referred to as $SA_{-1}$ 46) and a second assist solenoid valve 48 (hereinafter, referred to as $SA_{-2}$ 48). On the other hand, the third fluid pressure passage 42 communicates with a right front holding solenoid valve 50 (hereinafter, referred to as SFRH 50), a left front holding solenoid valve 52 (hereinafter referred to as SFLH 52) and a third assist solenoid valve 54 (hereinafter, referred to as $SA_{-3}$ 54). In this specification, the term solenoid means a solenoid valve.

The SFRH 50 is a two-position solenoid valve which maintains an open state in a normal state. The SFRH 50 communicates with the $SA_{-1}$ 46 and a right front wheel pressure decreasing solenoid valve 58 (hereinafter, referred to as SFRR 58) via a pressure adjusting fluid pressure passage 56. A check valve 60 permitting a fluid flow only in a direction from the pressure adjusting fluid pressure passage 56 to the third fluid pressure passage 42 is provided, in parallel, between the third fluid pressure passage 42 and the pressure adjusting fluid pressure passage 56.

The $SA_{-1}$ 46 is a two-position solenoid valve which selectively renders one of the first fluid pressure passage 36 and the pressure adjusting fluid pressure passage 56 to communicate with the wheel cylinder 44FR, and renders the first fluid pressure passage 36 and the wheel cylinder 44FR to be in a communicating state in a normal state (OFF state). On the other hand, the SFRR 58 is a two-position solenoid valve which renders the pressure adjusting fluid pressure passage 56 and the reservoir tank 16 to be in a connected state or a disconnected state. The SFRR 58 renders the pressure adjusting fluid pressure passage 56 and the reservoir tank 16 to be in a disconnected state in a normal state (OFF state).

The SFLH 52 is a two-position solenoid valve which maintains an open state in a normal state. The SFLH 52 communicates with the $SA_{-2}$ 48 and a left front wheel pressure decreasing solenoid valve 64 (hereinafter, referred to as SFLR 64) via a pressure adjusting fluid pressure passage 62. A check valve 66 permitting a fluid flow only in a direction from the pressure adjusting fluid pressure passage 62 to the third fluid pressure passage 42 is provided, in parallel, between the third fluid pressure passage 42 and the pressure adjusting fluid pressure passage 62.

The $SA_{-2}$ 48 is a two-position solenoid valve which selectively renders one of the first fluid pressure passage 36 and the pressure adjusting fluid pressure passage 62 to communicate with the wheel cylinder 44FL, and renders the first fluid pressure passage 36 and the wheel cylinder 44FL to be in a communicating state in a normal state (OFF state). On the other hand, the SFLR 64 is a two-position solenoid valve which renders the pressure adjusting fluid pressure passage 6:2 and the reservoir tank 16 to be in a connected state or a disconnected state. The SFLR 64 renders the pressure adjusting fluid pressure passage 62 and the reservoir tank 16 to be in a disconnected state from each other in a normal state (OFF state).

The second fluid pressure passage 38 communicates with the above-mentioned $SA_{-3}$ 54. The downstream side of the $SA_{-3}$ 54 communicates with a right rear wheel holding solenoid valve 68 (hereinafter, referred to as SRRH 68) provided in correspondence with a wheel cylinder 44RR of the right rear wheel. RR and a left rear wheel holding solenoid valve 70 (hereinafter, referred to as SRLR 70) provided in correspondence with a wheel cylinder 44RL of the left rear wheel RL. The $SA_{-3}$ 54 is a two-position solenoid valve which selectively selectively renders one of the second fluid pressure passage 38 and the third fluid pressure passage 42 to communicate with the SRRH 68 and the SRLR 70, and renders the second fluid pressure passage 38, the SRRH 68 and the SRLR 70 in a communicating state in a normal state (OFF state).

The downstream side of the SRRH 68 communicates with the wheel cylinder 44RR and a right rear wheel pressure decreasing solenoid valve 74 (hereinafter, referred to as SRRR 74) via a pressure adjusting fluid pressure passage 72. The SRRR 74 is a two-position solenoid valve which renders the pressure adjusting fluid pressure passage 72 and the reservoir tank 16 in a communicating state or a disconnected state, and renders the pressure adjusting fluid pressure passage 72 and the reservoir tank 16 in the disconnected state in a normal state (OFF state). Additionally, a check valve 76 permitting a fluid flow only in a direction from the pressure adjusting fluid pressure passage 72 to the $SA_{-3}$ 54 is provided, in parallel, between the $SA_{-3}$ 54 and the pressure adjusting fluid pressure passage 72.

Similarly, the downstream side of the SRLH 70 communicates with the wheel cylinder 44RL and a left rear wheel pressure decreasing solenoid valve 80 (hereinafter, referred to as SRLR 80) via a pressure adjusting fluid pressure passage 78. The SRLR 80 is a two-position solenoid valve which renders the pressure adjusting fluid pressure passage 78 and the reservoir tank 16 in a communicating state or a disconnected state, and renders the pressure adjusting fluid pressure passage 78 and the reservoir tank 16 in the disconnected state in a normal state (OFF state). Additionally, a check valve 82 permitting a fluid flow only in a direction from the pressure adjusting fluid pressure passage 78; to the $SA_{-3}$ 54 is provided, in parallel, between the $SA_{-3}$ 54 and the pressure adjusting fluid pressure passage 78.

In the system according to the present embodiment, a brake switch 84 is provided near the brake pedal 30. The brake switch 84 is a switch that generates an ON output when the brake pedal 30 is pressed. The output signal of the brake switch 84 is supplied to the ECU 10. The ECU 10 determines whether or not a braking operation is performed by the driver based on the output signal of the brake switch 84.

Additionally, in the system according to the present embodiment, wheel speed sensors 86FL, 86FR, 86RL and 86RR (hereinafter, these are referred to as 86 as a whole) are provided near the left and right front wheels FL and FR and the left and right rear wheels RL and RR, each of the sensors generating a pulse signal when the respective wheel rotates a predetermined angle. The output signals of the wheel speed sensors 86 are supplied to the ECU 10. The ECU 10 detects a wheel speed of each of the wheels FL, FR, RL and RR based on the output signals of the wheel speed sensors 86**.

The ECU 10 supplies, if necessary, drive signals to the above-mentioned STR 26, $SA_{-1}$ 46, $SA_{-2}$ 48, $SA_{-3}$ 54, SFRH 50, SFLH 52, SFRR 58, SFLR 64, SRRH 68, SRLH 70, SRRR 74 and SRLR 80 based on the output signal of the brake switch 84.

A description will now be given of an operation of the brake force control apparatus according to the present embodiment. The brake force control apparatus according to the present embodiment performs the normal control for generating a brake force corresponding to the brake pressing force $F_P$ exerted on the brake pedal 30 when the vehicle is in a stable state. The normal control can be achieved, as shown in FIG. 1, by turning off all of the STR 26, $SA_{-1}$ 46, $SA_{-2}$ 48, $SA_{-3}$ 54, SFRH 50, SFLH 52, SFRR 58, SFLR 64, SRRH 68, SRLH 70, SRRR 74 and SRLR 80 based on the output signal of the brake switch 84.

That is, in the state shown in FIG. 1, the wheel cylinders 44FR and 44FL communicate with the first fluid pressure passage 36, and the wheel cylinders 44RR and 44RL communicate with the second fluid pressure passage 38. In this case, the brake fluid flows between the master cylinder 32 and the wheel cylinders 44FR, 44FL, 44RL and 44RR (hereinafter, these may be referred to as 44** as a whole), and a brake force corresponding to the brake pressing force $F_P$ is generated in each of the wheels FL, FR, RL and RR.

In the present embodiment, when a possibility for shifting to a locked state is detected in one of the wheels, it is determined that a condition for performing an antilock brake control (hereinafter, referred to as ABS control) is established. The ECU 10 calculates wheel speeds $Vw_{FL}$, $Vw_{FR}$, $Vw_{RL}$ and $Vw_{RR}$ (hereinafter, these are referred to as $Vw^{}$ as a whole) of the wheels based on output signals of the wheel speed sensors 86****, and calculates an assumed value $V_{so}$ (hereinafter, referred to as an assumed vehicle speed $V_{so}$) of a speed of the vehicle according to a publicly known method. Then, when the vehicle is in a braking state, a slip rate S of each wheel is calculated according to the following equation so as to determine that the wheel may shift to a locked state when the slip rate S exceeds a predetermined value.

$$S = (Vso - Vw^{**}) \cdot 100 / Vso \quad (1)$$

When the condition for performing the ABS control is established for one of the wheels, the ECU 10 outputs the drive signals to the $SA_{-1}$ 46, $SA_{-2}$ 48 and $SA_{-3}$ 54 corresponding to the wheel of which condition for performing the ABS is established. It should be noted that the ABS control can be individually performed for the left and right wheels with respect to the front wheels, and the ABS control is performed commonly for the left and right wheels with respect to the rear wheels. If the execution condition for the ABS control is established for the right front wheel and, thus, the $SA_{-1}$ 46 is turned on the wheel cylinder 44FR is disconnected from the first fluid pressure passage 36 and connected to the pressure adjusting fluid pressure passage 56. Additionally, if the execution condition for the ABS control is established for the left front wheel and, thus, the $SA_{-2}$ 48 is turned on, the wheel cylinder 44FL is disconnected from the first fluid pressure passage 36 and connected to the pressure adjusting fluid pressure passage 62. Further, if the execution condition for the ABS control is established for the left rear wheel and the right rear wheel and, thus, the $SA_{-3}$ 54 is turned on, the upstream side of the SRRH 68 and the SRLH 70 is disconnected from the second fluid pressure passage 38 and connected to the third fluid pressure passage 42.

In this case, all wheel cylinders 44 on which the ABS control is performed communicate with respective holding solenoid valves SFRH 50, SFLH 52, SRRH 68 and SRLH 70 (hereinafter, these are referred to as holding solenoid SH) and respective pressure decreasing solenoid valves SFRR 58, SFLR 64, SRRR 74 and SRLR 80 (hereinafter, these are referred to as pressure decreasing solenoid SR), and a regulator pressure PRE is introduced to the upstream side of each of the holding solenoids SH via the third fluid pressure passage 42 and the STR 26.

In the above-mentioned condition, a wheel cylinder pressure $P_{W/C}$ of the respective wheel cylinders 44 is increased with the regulator pressure $P_{RE}$ as an upper limit by the holding solenoids SH being in an open state and the pressure decreasing solenoids SR being in a closed state. Hereinafter, this state is referred to as a pressure increasing mode ①. Additionally, the wheel cylinder pressure $P_{W/C}$ of the respective wheel cylinders 44** is maintained without being increased or decreased by the holding solenoids SH being in a closed state and the pressure decreasing solenoids SR being in the closed state. Hereinafter, this state is referred to as a holding mode ②. Further, the wheel cylinder pressure $P_{W/C}$ of the respective wheel cylinders 44** is decreased by the holding solenoids SH being in the closed state and the pressure decreasing solenoids SR being in the open state. Hereinafter, this state is referred to as a pressure decreasing mode ③. The ECU 10** achieves, if necessary, the above-mentioned pressure increasing mode ①, holding mode ② and pressure decreasing mode ③ so that a slip rate S of each wheel during a braking time becomes an appropriate value, that is, so that each wheel does not shift to the locked state.

When a depression of the brake pedal 30 is released by the driver during execution of the ABS control, the wheel cylinder pressure $P_{W/C}$ must be immediately decreased. In the system according to the present embodiment, the check valves 60, 66, 76 and 82 are provided in hydraulic pressure paths corresponding to each of the wheel cylinders 44, each of the check valves 60, 66, 76 and 82 permitting a fluid flow only in the directions from the wheel cylinders 44** to the third fluid pressure passage 42. Thus, according to the system of the present embodiment, the wheel cylinder pressures $P_{W/C}$ of all of the wheel cylinders 44** can be immediately decreased after the depression of the brake pedal 30** is released.

In the system according to the present embodiment, when the ABS control is performed, the wheel cylinder pressure $P_{W/C}$ is increased by the brake fluid being supplied from the regulator 24 to the wheel cylinders 44, that is, by the brake fluid being supplied from the pump 12 to the wheel cylinders 44**, and is decreased by the brake fluid in the wheel cylinders 44** flowing to the reservoir tank 16. When the increase in the wheel cylinder pressure $P_{W/C}$ is performed by using the master cylinder 32 as a fluid pressure source and if the pressure increasing mode and the pressure decreasing mode are repeatedly performed, the brake fluid in the master cylinder 32** gradually decreases and a so-called bottoming of the master cylinder may occur.

On the other hand, if the pump 12 is used as a fluid pressure source so as to increase the wheel cylinder pressure $P_{W/C}$, as in the system according to the present embodiment, such a bottoming can be prevented. Thus, in the system according to the present embodiment, a stable operational state can be maintained if the ABS control is continued for a long time.

In the system according to the present embodiment, the ABS control is started when a possibility for shifting to the locked state is detected in one of the wheels. Accordingly, in order to start the ABS control, as a precondition, a braking operation having a level at which a large slip rate S is generated in one of the wheels must be performed.

Figure 2:
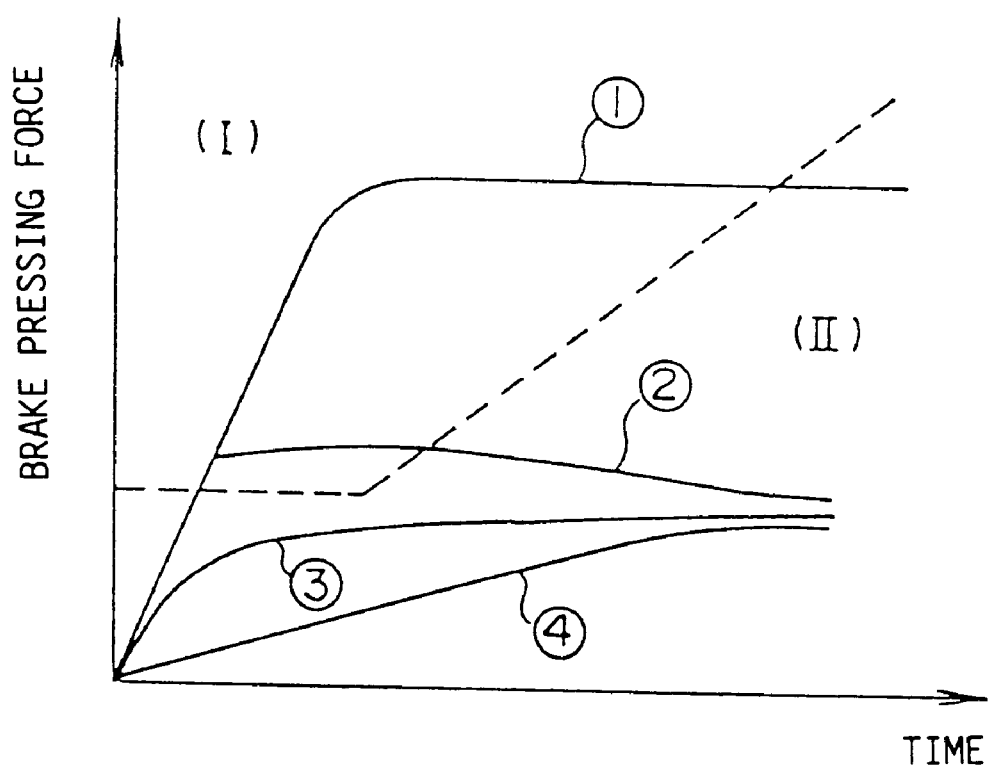
FIG. 2 is an illustration for showing a change in a brake pressing force achieved under various circumstances.

A description will now be given of an operation of the system according to the system of the present embodiment with respect to an emergency braking operation. FIG. 2 shows changes in the brake pressing force $F_P$ applied to the brake pedal 30 with respect to time under various conditions. Curves indicated by ① and ② in FIG. 2 represent changes in the pressing force $F_P$ when an emergency braking is performed by a highly skilled driver (hereinafter, referred to as a high-grade driver) and an unskilled driver or a driver lacking strength (hereinafter, referred to as a beginner-grade driver), respectively. The emergency braking operation is an operation performed when is it desired to rapidly decelerate a vehicle. Accordingly, the brake pressing force associated with the emergency braking operation is preferably a force sufficiently large as the ABS control is performed.

As shown by the curve ①, when the driver of the vehicle is a high-grade driver, the brake pressing force $F_P$ is immediately and rapidly increased in response to establishment of a condition in which an emergency braking is required, and a large brake pressing force $F_P$ can be maintained for a long time. If such a brake pressing force $F_P$ is exerted on the brake pedal 30, a sufficiently high brake fluid pressure can be provided from the master cylinder 32 to each of the wheel cylinders 44** so as to start the ABS control, and rapid braking can be achieved.

However, as shown by the curve ② when the driver of the vehicle is a beginner-grade driver, the brake pressing force $F_P$ may not be increased to a sufficiently high value in response to establishment of the condition in which an emergency braking is required. If the brake pressing force $F_P$ exerted on the brake pedal 30 is not sufficiently increased as shown by the curve ② after an emergency braking is required, the wheel cylinder pressure $P_{W/C}$ in each of the wheels 44** is not sufficiently increased, which results in a possibility that the ABS control is not started.

As mentioned above, when the driver of the vehicle is a beginner-grade driver, the braking ability of the vehicle may not be sufficiently performed even when an emergency braking operation is performed despite that the vehicle has a good braking ability. Accordingly, the system according to the present embodiment is provided with a brake assist function for sufficiently increasing the wheel cylinder pressure $P_{W/C}$ even if the brake pressing force $F_P$ is not sufficiently increased when the brake pedal is operated with an intention to perform an emergency braking. Hereinafter, a control performed by the ECU 10 to achieve such a function is referred to as a brake assist control.

In the system according to the present embodiment, when performing the brake assist control, an accurate determination must be made as to whether, when the brake pedal 30 is operated, the operation is intended to perform an emergency braking operation or to perform a regular braking operation.

Curves indicated by shown ③ and ④ in FIG. 2 show changes in the brake pressing force $F_P$ when the driver operates the brake pedal with an intention to perform a normal braking operation under various conditions. As shown by the curves ① to ④, a change in the brake pressing force $F_P$ associated with the normal braking operation is gentle as compared to a change in the brake pressing force $F_P$ associated with an emergency braking operation. Additionally, a convergent value of the brake pressing force $F_P$ associated with the normal braking operation is not so large as a convergent value of the brake pressing force $F_P$ associated with an emergency braking operation.

Giving attention to those differences, when the brake pressing force $F_P$ is increased to a sufficiently large value at a rate of change exceeding a predetermined value after a braking operation is started, that is, when the brake pedal 30 is operated so that the brake pressing force $F_P$ reaches an area indicated by (I) in FIG. 2, it can be determined that an emergency braking is performed.

Additionally, when the rate of change of the brake pressing force $F_P$ is smaller than the predetermined value or when the convergent value of the brake pressing force $F_P$ is smaller than the predetermined value, that is, when the brake pedal 30 is operated so that the brake pressing force $F_P$ always changes within an area indicated by (II) in FIG. 2, it can be determined that a normal braking operation is performed.

Accordingly, in the system according to the present embodiment, an operational speed and an amount of operation of the brake pedal are detected or assumed, and, then, it is determined whether or not the operational speed exceeds a predetermined value and whether or not the amount of operation exceeds the predetermined value, and, thereby, it can be determined whether or not the operation on the brake pedal 30 is intended to perform an emergency braking.

In the vehicle provided with the brake force control apparatus according to the present embodiment, the brake pedal 30 is operated by being pressed. An operational speed of the brake pedal 30 approximately corresponds to a rate of change in the brake pressing force $F_P$. Additionally, an amount of operation of the brake pedal 30 approximately corresponds to a value of the brake pressing force $F_P$. Accordingly, the operational speed and the amount of operation of the brake pedal 30 can be accurately assumed from the brake pressing force $F_P$.

When the brake pressing force $F_P$ is exerted on the brake pedal 30, a stroke corresponding to the brake pressing force $F_P$ is generated in the brake pedal 30. Additionally, when the stroke L is generated in the brake pedal 30, a master cylinder pressure $P_{M/C}$ corresponding to the stroke L, which corresponds to the brake pressing force $F_P$, is generated in the master cylinder 32. When the master cylinder pressure $P_{M/C}$ corresponding to the brake pressing force $F_P$ is generated, a vehicle deceleration G corresponding to the brake pressing force $F_P$ is generated in the vehicle. Accordingly, an operational speed and an amount of operation of the brake pedal 30 can be assumed from parameters including ② the pedal stroke L, ③ the master cylinder pressure $P_{M/C}$, ④ the vehicle deceleration G, ⑤ the assumed vehicle speed $V_{SO}$ and ⑥ the wheel speed $V_W$**, other than the above-mentioned ① brake pressing force $F_P$.

In order to accurately assume an operational speed and an amount of operation of the brake pedal 30, that is, in order to accurately discriminate an emergency braking and a normal brake, preferred parameters of the above-mentioned parameters (hereinafter, referred to as basic parameters) are those detected at a position closer to the foot of the driver. According to such a point of view, the parameters ① to ⑥ have a superiority in the order of ①→⑥ when used as the basic parameters.

In order to detect ① the brake pressing force $F_P$, it is required to provide (i) a pressing force sensor. Additionally, in order to detect ② the pedal stroke L, it is required to provide (ii) a stroke sensor, Similarly, in order to detect ③ the master cylinder pressure $P_{M/C}$ and ④ the vehicle deceleration G, it is required to provide a (iii) a hydraulic pressure sensor and (iv) a deceleration sensor, respectively. Further, in order to detect ⑤ the assumed vehicle speed $V_{SO}$ and ⑥ the wheel speed $V_W$**, it is required to provide (v) a wheel speed sensor.

The (v) wheel speed sensor and the (iv) deceleration sensor among the above-mentioned sensors (i) to (v) are conventionally and widely used sensors for a vehicle. On the other hand, the (ii) stroke sensor and the (i) pressing force sensor are not popular sensors for a vehicle. Accordingly, considering a cost merit of a sensor due to a mass production effect, the above-mentioned sensors (i) to (v) have a superiority in the order of (v)→(i).

In the system according to the present embodiment, considering the above-mentioned merit and demerit, the hydraulic pressure sensor 40 is used as a sensor for detecting the basic parameters sc as to discriminate an emergency braking operation and a normal braking operation by using the master cylinder pressure $P_{M/C}$ as a basic parameter. A description will now be given of an operation of the system according to the present embodiment when it is determined by the ECU 10 that an emergency braking is performed.

The ECU 10 determines that an emergency braking is performed when the master cylinder pressure $P_{M/C}$ exceeding the predetermined value is detected and a rate of change $\Delta P_{M/C}$ is detected after the brake pedal 30 is pressed. When it is determined that an emergency braking is performed, the ECU 10 outputs the drive signals to the STR 26, the $SA_{-1}$ 46, the $SA_{-2}$ 48 and the $SA_{-3}$ 54.

When the STR 26 is turned on upon receipt of the above-mentioned drive signal, the third fluid pressure passage 42 and the high-pressure passage 22 are directly connected to each other. In this case, an accumulator pressure PACC is introduced into the third fluid pressure passage 42. Additionally, when the $SA_{-1}$ 46 and the $SA_{-2}$ 48 are turned on upon receipt of the drive signals, the wheel cylinders 44FR and 44FL communicate with the pressure adjusting fluid pressure passages 56 and 62, respectively. Further, when the $SA_{-3}$ 54 is turned on upon receipt of the above-mentioned drive signal, the upstream side of the SRRH 68 communicates with the third fluid pressure passage 42. In this case, a state is established in which all of the wheel cylinders 44\*\* communicate with the respective holding solenoids S\*\*H and the respective pressure decreasing solenoids S\*\*R and the accumulator pressure $P_{ACC}$ is introduced to the upstream side of each of the holding solenoids S\*\*H.

In the ECU 10, all of the holding solenoids S\*\*H and all of the pressure decreasing solenoids S\*\*R are maintained in the OFF state immediately after execution of an emergency braking is detected. Accordingly, as mentioned above, when the accumulator pressure $P_{ACC}$ is introduced to the upstream side of the holding solenoids S\*\*H, the fluid pressure is provided to the wheel cylinders 44\*\* without being changed. As a result, the wheel cylinder pressure $P_{W/C}$ of all of the wheel cylinders 44\*\* is increased toward the accumulator pressure $P_{ACC}$.

As mentioned above, according to the system of the present embodiment, when an emergency breaking is performed, the wheel cylinder pressure $P_{W/C}$ of all of the wheel cylinders 44\*\* can be immediately increased irrespective of a magnitude of the brake pressing force $F_P$. Thus, according to the system of the present embodiment, a large brake force can be generated immediately after establishment of a condition in which an emergency braking is required, even if the driver is a beginner-grade driver.

It should be noted that when the ABS control is performed subsequent to an emergency braking operation, the wheel cylinder pressure $P_{W/C}$ is increased by using the pump 12 and the accumulator 20 as a fluid pressure source, and is decreased by the brake fluid in the wheel cylinders 44\*\* flowing to the reservoir tank 16. Accordingly, if the pressure increasing mode and the pressure decreasing mode are repeated, a so-called bottoming of the master cylinder 32 does not occur.

When the brake assist control is started as mentioned above by execution of an emergency braking operation, the brake assist control must be ended when a press of the brake pedal 30 is released. In the system according to the present invention, as mentioned above, the STR 26, the $SA_{-1}$ 46, the $SA_{-2}$ 48 and the $SA_{-3}$ 54 are maintained to be in the ON state. When the STR 26, the $SA_{-1}$ 46, the $SA_{-2}$ 48 and the $SA_{-3}$ 54 are in the ON state, each of the fluid pressure chamber in the regulator 24 and the first fluid pressure chamber 32*a* and the second fluid pressure chamber 32*b* becomes substantially a closed space.

Under the above-mentioned condition, the master cylinder pressure $P_{M/C}$ becomes a value corresponding to the brake pressing force $F_P$. Accordingly, by monitoring the output signal of the master cylinder pressure $P_{M/C}$ detected by the hydraulic pressure sensor 40, it can be easily determined whether or not a depression of the brake pedal 30 is has been released. When the release of the press of the brake pedal 30 is detected, the ECU 10 stops the supply of the drive signals to the STR 26, the $SA_{-1}$ 46, the $SA_{-2}$ 48 and the $SA_{-3}$ 54 so as to perform the normal control.

As for the basic parameters which are the basis of discrimination between an emergency braking and a normal brake, ① the brake pressing force $F_P$, ② the pedal stroke L, ④ the vehicle deceleration G, ⑤ the assumed vehicle speed $V_{SO}$ and ⑥ the wheel speed $V_W$\*\* other than the above-mentioned ③ master cylinder pressure $P_{M/C}$ may be applicable. Among those parameters, the ① brake pressing force $F_P$ and ② the pedal stroke L are parameters that are sensitive to a change in the brake pressing force $F_P$, similar to ③ the master cylinder pressure $P_{M/C}$. Accordingly, when ① the brake pressing force $F_P$ or ② the pedal stroke L is used as a basic parameter, it can be easily determined whether or not the press of the brake pedal 30 is released by monitoring the parameter.

On the other hand, the parameters ④ to ⑥ vary when a brake force of each wheel is changed. If the depression of the brake pedal 30 is released, there is no large changes generated in these parameters. Accordingly, when the parameters ④ to ⑥ are used as the basic parameter, it is effective to perform a determination for a termination of the brake assist control based on the output state of a pressing force switch that: is provided for detecting whether or not the brake pressing force $F_P$ is applied.

As mentioned above, the system according to the present embodiment has a function to perform the ABS control by preventing a lock of a wheel so as to improve a driving stability and to perform the brake assist control to increase a bake force when an emergency braking is required. Further, the system according to the present embodiment has a function to perform the VSC and the TRC other than the above-mentioned ABS control as a control for improving a driving stability of a vehicle.

The VSC is a control for preventing an inner turning wheel from being set in a state in which the inner turning wheel is easily locked due to a difference between loads applied to an outer turning wheel and the inner turning wheel when a vehicle is turning. That is, the VSC control is performed for the purpose of equalizing slip rates of the inner turning wheel and the outer turning wheel by setting a wheel cylinder pressure of the inner turning wheel to be lower than a wheel cylinder pressure of the outer turning wheel. Such a control can be achieved by controlling the wheel cylinder pressure of the inner turning wheel so that the slip rate of the inner turning wheel becomes equal to the slip rate of the outer turning radius.

The TRC is a control for preventing a driving wheel from idling due to an excessive driving torque. Such a control can be achieved by monitoring a slip rate of the driving wheel during a normal or accelerating operation and controlling a wheel cylinder pressure of the driving wheel so that the slip rate does not exceed a target slip rate.

As mentioned above, the ABS control, the VSC and the TRC are for controlling a driving stability of a vehicle by controlling a brake force. Accordingly, similar to the ABS control, the VSC and the TRC can be achieved by the ECU 10 performing the control routine corresponding to the respective control in the brake force control apparatus shown in FIG. 1. That is, the VSC and the TRC are achieved by controlling the wheel cylinder pressure toward a target value corresponding to the respective control by the ECU 10 switching the holding solenoids SH and the pressure decreasing solenoids SR so as to set the ① pressure-increasing mode, the ② holding mode or the ③ pressure-decreasing mode.

Further, the brake force control apparatus of the present embodiment may be provided in a vehicle having a control apparatus performing an attenuation force control, a rear wheel steering angle control and a tire air pressure control which are performed for the purpose of improving a driving stability of a vehicle. According to the attenuation force control, an attenuation force control ECU provides a driving signal to an attenuation force control actuator in response to a driving condition of the vehicle and controls a rolling rigidity distribution by changing an attenuation force of a shock absorber, and, thereby, a driving stability can be controlled.

The rear wheel steering angle control is a control for improving a driving stability of a vehicle by controlling a steering angle of a rear wheel in response to a driving condition of the vehicle. According to the rear wheel steering angle control, a rear wheel steering control ECU provides a drive signal to a rear wheel steering actuator based on a steering angle of a steering wheel, a vehicle speed or a yaw rate so as to change and control a turning characteristic of the vehicle, and, thereby, a driving stability of the vehicle can be controlled.

The tire air pressure control is a control for improving a driving stability of a vehicle by always appropriately maintaining an air pressure of a wheel. Such a control can be achieved by providing a drive signal to an air compressor based on an air pressure of measured by a tire pressure sensor provided to each wheel.

It should be noted that, hereinafter the ABS control, the VSC, the TRC, the attenuation force control, the rear wheel steering angle control and the tire air pressure control are referred to as a vehicle characteristic changing control as a whole. As mentioned above, the vehicle characteristic changing control is achieved for the purpose of maintaining a driving stability of a vehicle. Accordingly, if an abnormality occurs in the vehicle characteristic changing control, measures are not taken to maintain the driving stability when the vehicle is set in a state in which the driving stability cannot be maintained. If an emergency braking is required under such a condition, a brake force is increased by the assist brake control being performed. As a result, a side force which can be generated by a wheel is reduced, and the driving stability of the vehicle is changed.

For example, if a malfunction occurs in the holding solenoids SH or the pressure decreasing solenoids SR, a state in which the ABS control, the VSC control and the TRC control cannot be performed is set. In this condition, it is possible that a slip rate S becomes an excessive value since a brake force is not decreased if the slip rate S exceeds a target value. In this case, when the brake assist control is performed, the slip rate S is increased due to an increase in the brake force, and a change in a driving stability of the vehicle is increased.

The brake force control apparatus according to the present embodiment has a feature in that a change in a driving stability due to execution of the brake assist control can be controlled to be small when an abnormality occurs in the vehicle characteristic changing control.

Generally, during a braking operation of a vehicle, a load on the rear wheel side is reduced since the load of the vehicle shifts toward the front wheel side. Accordingly, a brake force generated by the rear wheels is reduced and a state in which the rear wheels are easily locked as compared to the front wheels is established. Accordingly, when the brake assist control is performed under a condition in which an abnormality occurs in the vehicle characteristic changing apparatus, a driving stability of the vehicle can be maintained by reducing the brake force applied to the rear wheels which are easily locked as compared to the front wheels. Thus, in the present embodiment, when an abnormality occurs in one of the vehicle characteristic changing apparatuses, a slope of a pressure increase in the brake force during the brake assist control is reduced so as to control the change in the driving stability associated with the execution of the brake assist control.

A description will now be given, with reference to FIG. 3, of contents of a process performed by the ECU 10 so as to achieve the above-mentioned function.

Figure 3:
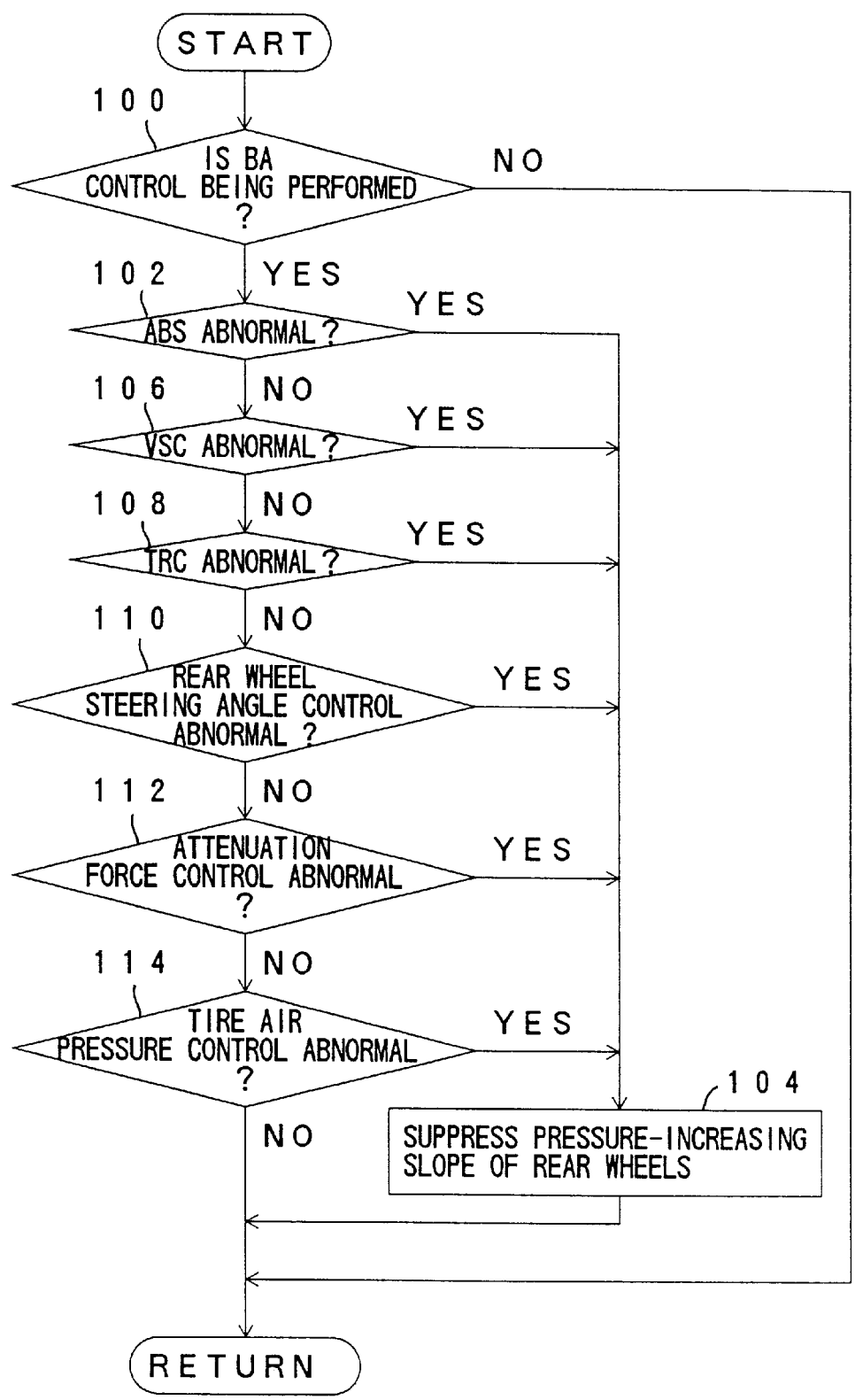
FIG. 3 is a flowchart of a routine performed in the brake force control apparatus shown in FIG. 1.

FIG. 3 is a flowchart of an example of a control routine performed by the ECU 10. It should be noted that the routine shown in FIG. 3 is an interruption routine started at every predetermined time. In the system of the present embodiment, the ECU 10 performs the present routine concurrently with a control routine for performing each of the brake assist control, the ABS control, the VSC and the TRC. Upon detection of an abnormality during the execution of ABS control, the VSC or the TRC, the ECU 10 sets an abnormality detection flag corresponding to the control so as to determine whether or not an abnormality occurs in each control by checking a state of the abnormality detection flag. Additionally, the ECU 10 has a function to communicate with the attenuation force control ECU, the rear wheel steering angle control ECU and the tire air pressure control ECU. The ECU 10 detects an occurrence of an abnormality by receiving an abnormality signal from each ECU when abnormality occurs in the controls.

When the routine shown in FIG. 3 is started, the process of step 100 is performed first. In step 100, it is determined whether or not the brake assist control is being performed. If it is determined, in step 100, that the brake assist control is not being performed, the routine is ended without performing any process thereafter. On the other hand, if it is determined that the brake assist control is being performed, the process of step 102 is performed next.

In step 102, it is determined whether or not an abnormality occurs in the ABS control. If it is determined that an abnormality occurs in the ABS control, the process of step 104 is then performed. On the other hand, if it is determined that the ABS control is normally performed, the process of step 106 is then performed.

In step 104, a slope of pressure increase of the master cylinders 44RR and 44RL of the rear wheels during the execution of the brake assist control is reduced. This process is performed by issuing an instruction to reduce the slope of the pressure increase of 44RR and 44RL with respect to the control routine of the brake assist control.

As mentioned above, during the execution of the brake assist control, the STR 26 and the $SA_{-3}$ 54 are turned on and a high pressure in the accumulator 20 is introduced into the master cylinder RR44 and RL44 of the rear wheels via the SRRH 68 and the SRLH 70, and, thereby, the pressure in the RR44 and RL44 is increased. Accordingly, the pressure-increasing slope of the RR44 and RL44 can be arbitrarily adjusted by duty control of an open/close of the SRRH 68 and the SRLH 70. When the instruction for reducing the slope of the pressure increase is issued in the step 104, the ECU 10 reduces the pressure increasing slope of the 44RR and 44RL by duty-controlling drive signals provided to the SRRH 68 and SRLH 70. Thus, according to the brake force control apparatus of the present embodiment, the pressure increasing slope of the rear wheels during the execution of the brake assist control is reduced in a state in which an abnormality occurs in the ABS control.

In step 106, it is determined whether or not an abnormality occurs in the VSC. If it is determined that an abnormality occurs in the VSC, the process of step 104 is then performed. Thus, according to the brake force control apparatus of the present embodiment, the pressure increasing slope of the rear wheels during the execution of the brake assist control is reduced in the state in which an abnormality occurs in the VSC.

In step 108, it is determined whether or not an abnormality occurs in the TRC. If it is determined that an abnormality occurs in the TRC, the process of step 104 is performed. Thus, according to the brake force control apparatus of the present embodiment, the pressure increasing slope of the rear wheels during the execution of the brake assist control is reduced in the state in which an abnormality occurs in the TRC. On the other hand, if it is determined that the TRC is normally performed, the process of step 110 is then performed.

In step 110, it is determined whether or not an abnormality occurs in the rear wheel steering angle control. If it is determined that an abnormality occurs in the rear wheel steering angle control, the process of step 104 is performed. Thus, according to the brake force control apparatus of the present embodiment, in a state in which an abnormality occurs in the rear wheel steering angle control, the pressure-increasing slope of the rear wheel during the execution of the brake assist control is reduced. On the other hand, if it is determined that the rear wheel steering angle control is normally performed, the process of step 112 is then performed.

In step 112, it is determined whether or not an abnormality occurs in the attenuation force control. If it is determined that an abnormality occurs in the attenuation force control, the process of step 104 is then performed. Thus, according to the brake force control apparatus of the present embodiment, the pressure increasing slope of the rear wheels during the execution of the brake assist control is reduced in a state in which an abnormality occurs in the attenuation force control. On the other hand, if it is determined that the attenuation force control is normally performed, the process of step 114 is then performed.

In step 114, it is determined whether or not a tire air pressure is abnormal. If it is determined that the tire air pressure is abnormal, it can be determined that an abnormality occurs in the tire air pressure control. In this state, thereafter, the process of step 104 is performed. Thus, according to the brake force control apparatus of the present embodiment, the pressure increasing slope of the rear wheels during the execution of the brake assist control is reduced in a state in which an abnormality occurs in the tire air pressure control. On the other hand, if it is determined that the tire air pressure is normal, the routine at this time is ended without performing any process thereafter. Thus, according to the brake force control apparatus of the present embodiment, if all of the ABS control, the VSC, the TRC, the attenuation force control, the rear wheel steering angle control and the tire air pressure control are normal, the brake assist control is normally continued until a predetermined end condition is established.

As mentioned above, according to the system of the present embodiment, when an abnormality occurs in the vehicle characteristic changing control, the pressure increasing slope of the rear wheels during the execution of the brake assist control is reduced thereafter. Thereby, a change in a driving stability of a vehicle can be controlled while achieving a desired emergency braking.

It should be noted that, in the above-mentioned embodiment, although a driving stability is maintained while obtaining an effect of the pressure increase of the rear wheels according to the brake assist control by reducing only the pressure increasing slope of the rear wheels, the present invention is not limited to this, and the driving stability of vehicle may be improved by reducing the pressure increasing slope of the front wheels together with the pressure increasing slope of the rear wheels.

It should be noted that, in the present embodiment, apparatuses related to the ABS control, the VSC, the TRC, the attenuation force control, the rear wheel steering angle control and the tire air pressure control correspond to the vehicle characteristic changing apparatuses. Additionally, pressure-increasing slope suppressing means is achieved by the ECU 10 performing the routine shown in FIG. 3.

A description will now be given, with reference to FIG. 4, of a second embodiment of the present invention. A brake force control apparatus according to the present embodiment has a feature in that the brake assist control is ended when the an abnormality occurs in one of the vehicle characteristic changing controls during the execution of the brake assist control.

Figure 4:
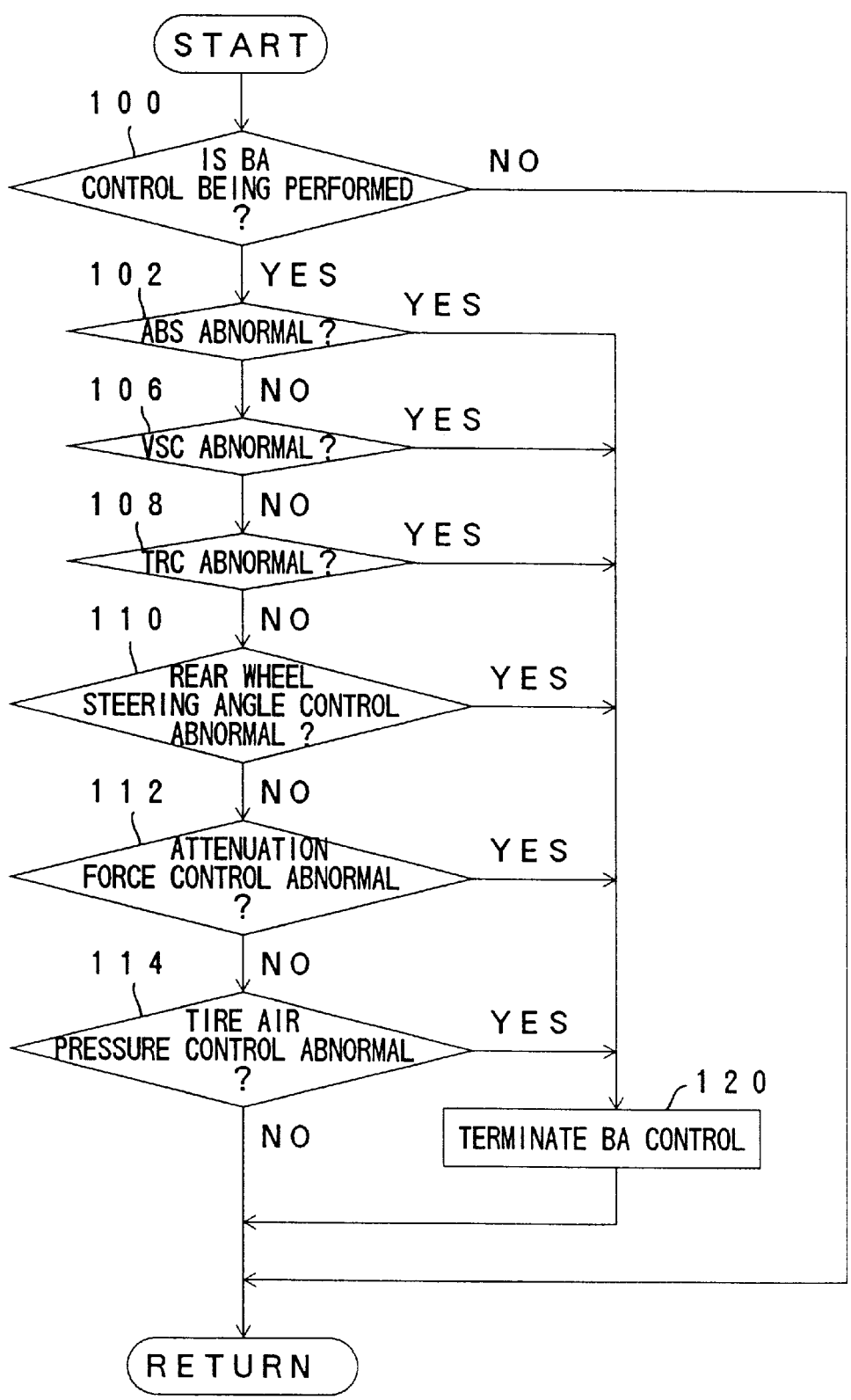
FIG. 4 is a flowchart of a routine performed in a second embodiment of the present invention.

FIG. 4 shows a flowchart of an example of a routine performed by the ECU 10 in the present embodiment. A brake force control apparatus according to the present embodiment is the same as the brake force control apparatus according to the above-mentioned first embodiment with respect to the system structure diagram shown in FIG. 1 except for the ECU 10 performing the control routine shown in FIG. 4. It should be noted that, in the routine shown in FIG. 4, steps that perform the same process as the steps in the routine shown in FIG. 3 are given the same reference numerals, and descriptions thereof will be omitted.

In the present routine, if it is determined, in steps 102 and 106–114, that an abnormality occurs in one of the vehicle characteristic changing controls after it is determined, in step 120, that the brake assist control is being performed, the process of step 120 is performed next.

In step 120, the brake assist control is forcibly terminated. Thus, according to the present embodiment, the brake assist control is not continued when an abnormality occurs in one of the vehicle characteristic changing controls during the execution of the brake assist control. It should be noted that the process of step 120 is performed by issuing an end instruction to the control routine of the brake assist control. After the process of step 120 is completed, the routine at this time is ended.

On the other hand, if it is determined, in step 100, that the brake assist control is not being performed, and if it is determined, in step 102 and 106–114, that an abnormality does not occur in the vehicle characteristic changing controls, the routine at this time is ended without performing any process thereafter.

As mentioned above, according to the brake force control apparatus of the present embodiment during the execution of the brake assist control, the brake assist control is forcibly terminated. Thereby, when a state in which a driving stability of a vehicle cannot be maintained is established, the driving stability is prevented from being changed due to an increase in a brake force by the execution of the brake assist control.

It should be noted that, in the above-mentioned embodiment, apparatuses related to the ABS control, the VSC, the TRC, the attenuation force control, the rear wheel steering angle control and the tire air pressure control correspond to the vehicle characteristic changing apparatuses. Additionally, control prohibiting means is achieved by the ECU 10 performing the routine shown in FIG. 4.

A description will now be given, with reference to FIG. 5, of a third embodiment of the present invention. A brake force control apparatus according to the present embodiment is the same as the brake force control apparatus according to the above-mentioned first embodiment with respect to the system structure diagram shown in FIG. 1 except for the ECU 10 performing the control routine shown in FIG. 5. The brake force control apparatus according to the present embodiment has feature in that a driving stability of a vehicle is controlled by controlling a brake force among the vehicle characteristic changing controls. That is, the brake assist control is terminated and a driving stability is controlled by another means other than the control of a brake force when an abnormality does not occur in one of the ABS control, the VSC and the TRC. That is, the pressure increasing slope of the rear wheels is reduced in the brake assist control when an abnormality occurs in the rear wheel steering angle control, the attenuation force control or the tire air pressure control.

Figure 5:
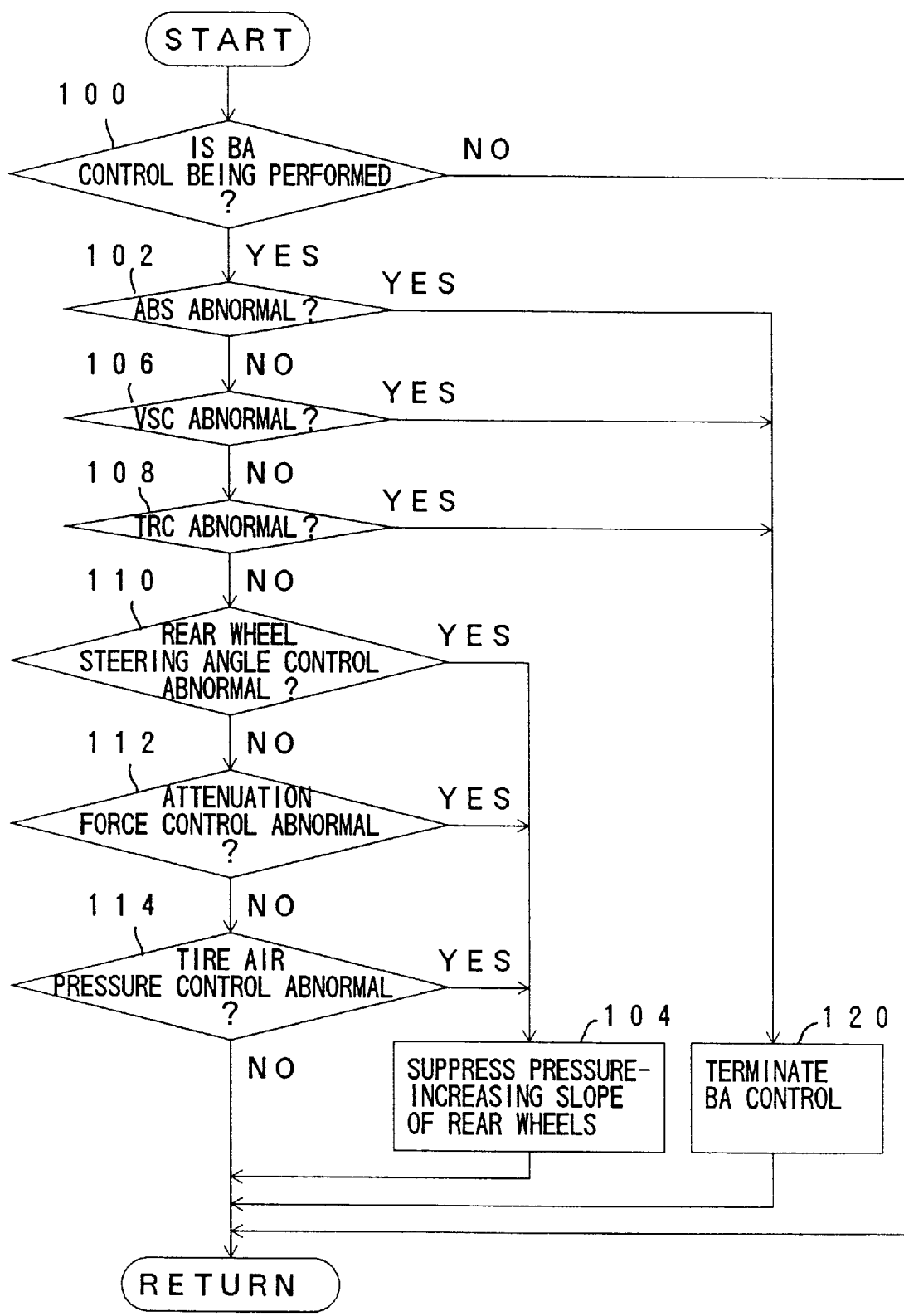
FIG. 5 is a flowchart of a routine performed in a third embodiment of the present invention.

FIG. 5 shows a flowchart of an example of a routine performed by the ECU 10 in the present embodiment. In the routine shown in FIG. 5, steps that perform the same process as the steps in the routine shown in FIG. 3 are given the same reference numerals, and descriptions thereof will be omitted. In the present routine, if it is determined, in steps 102, 106 and 108, that an abnormality occurs in one of the ABS control, the VSC and the TRC after it is determined, in step 100, that the brake assist control is being performed, the brake assist control is forcibly terminated in step 120. After the process of step 120 is completed, the routine at this time is ended.

On the other hand, if it is determined, in one of steps 110–114, that an abnormality occurs in the rear wheel steering angle control, the attenuation force control or the tire air pressure control after it is determined, in steps 102, 106 and 108, that an abnormality does not occur in any one of the ABS control, the VSC and the TRC, the pressure increasing slope of the rear wheels during the brake assist control is reduced in step 104. After the process of step 104 is completed, the routine at this time is ended.

As mentioned above, the ABS control, the VSC and the TRC are controls for maintaining a driving stability of a vehicle by controlling a brake force so that the wheels are not locked. Thus, if an abnormality occurs in one of the ABS control, the VSC and the TRC, necessary measures will not be taken despite that the wheels tend to be locked and, thus, a brake force should be reduced. In such a case, if the brake assist control is performed, a possibility for the wheels being locked is increased due to an increase in the brake force, and an amount of change in the driving stability of the vehicle is further increased.

On the other hand, according to the system of the present embodiment, if an abnormality occurs in one of the ABS control, the VSC and the TRC, the brake assist control is forcibly terminated. Thereby, as mentioned above, the driving stability is prevented from being changed due to the execution of the brake assist control when an abnormality occurs in these controls.

On the other hand, the rear wheel steering control, the attenuation force control and the tire air pressure control are for controlling the driving stability of a vehicle by means other than a control of a brake force. Accordingly, it is considered that the driving stability of the vehicle does not greatly changed even if a brake force is slightly changed when an abnormality occurs in these controls. Thus, in the present embodiment, when an abnormality occurs in one of the rear wheel steering control, the attenuation force control and the tire air pressure control, the brake assist control is performed while the pressure increasing slope is reduced. As mentioned above, according to the system of the present embodiment, a maintenance of the driving stability of the vehicle when a malfunction occurs in the vehicle characteristic changing control is compatible with an increase of a brake effect according to the brake assist control.

It should be noted that, in the present embodiment, apparatuses related to execution of the ABS control, the VSC and the TRC correspond to the vehicle characteristic changing apparatuses. Additionally, control-prohibiting means is achieved by the ECU 10 performing the process of steps 102, 106, 108 and 120 of the routine shown in FIG. 5.

A description will now be given, with reference to FIG. 6, of a fourth embodiment of the present invention. A brake force control apparatus according to the present embodiment is the same as the brake force control apparatus according to the above-mentioned first embodiment with respect to the system structure diagram shown in FIG. 1 except for the ECU 10 performing the control routine shown in FIG. 6. The brake force control apparatus according to the present embodiment has a feature in that a determination is performed as to whether or not an abnormality occurs in the vehicle characteristic changing controls, and the pressure increasing slope of the rear wheels is controlled during the brake assist control if an abnormality occurs in the one of the vehicle characteristic changing controls.

Figure 6:
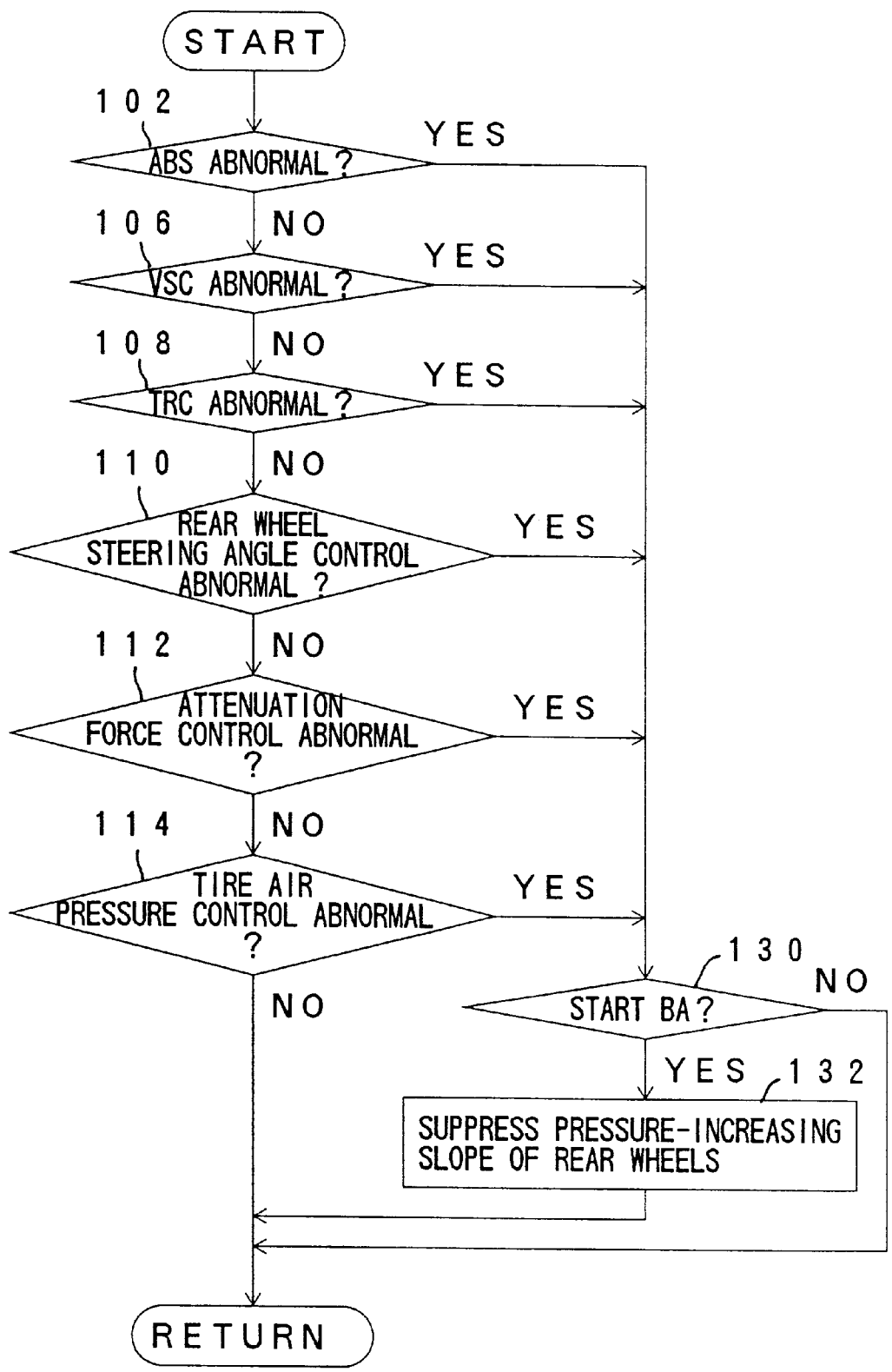
FIG. 6 is a flowchart of a routine performed in a fourth embodiment of the present invention.

FIG. 6 shows a flowchart of an example of a routine performed by the ECU 10 in the present embodiment. In the routine shown in FIG. 6, steps that perform the same process as the steps in the routine shown in FIG. 3 are given the same reference numerals, and descriptions thereof will be omitted.

In the present routine, if it is determined, in steps 102 and 106–114, that an abnormality occurs in one of the vehicle characteristic changing controls, the process of step 130 is performed. On the other hand, if it is determined, in steps 102 and 106–114, that an abnormality does not occur in each of the vehicle characteristic changing controls, the routine at this time is ended without performing any process thereafter.

In step 130, it is determined whether or not a start condition of the brake assist control is established. If it is determined that the above-mentioned condition is established, the process of step 132 is then performed. On the other hand, if it is determined that the abovementioned condition is not established, the routine at this time is ended without performing any process thereafter.

In step 132, the pressure-increasing slope of the rear wheels is reduced. This process is performed by issuing an instruction to reduce the slope of the pressure increase of the master cylinders 44RR and 44RL of the rear wheels with respect to the control routine of the brake assist control.

Thus, according to the brake force control apparatus of the present embodiment, if an abnormality occurs in one of the vehicle characteristic changing controls, the brake assist control is performed while the pressure increasing slope of the rear wheels is reduced. After the process of step 132 is completed, the routine at this time is ended.

As mentioned above, according to the system of the present embodiment, when an abnormality occurs in one of the vehicle characteristic changing controls, the pressure increasing slope of the rear wheels during the execution of the brake assist control is reduced thereafter. Thereby, when an abnormality occurs in the vehicle characteristic changing controls, the driving stability of the vehicle is prevented from being changed due to the execution of the brake assist control.

It should be noted that, in the present embodiment, apparatuses related to execution of the ABS control, the VSC, the TRC, the attenuation force control, the rear wheel steering angle control and the tire air pressure control correspond to the vehicle characteristic changing apparatuses. Additionally, pressure-increasing slope suppressing means is achieved by the ECU 10 performing the routine shown in FIG. 6.

Figure 7:
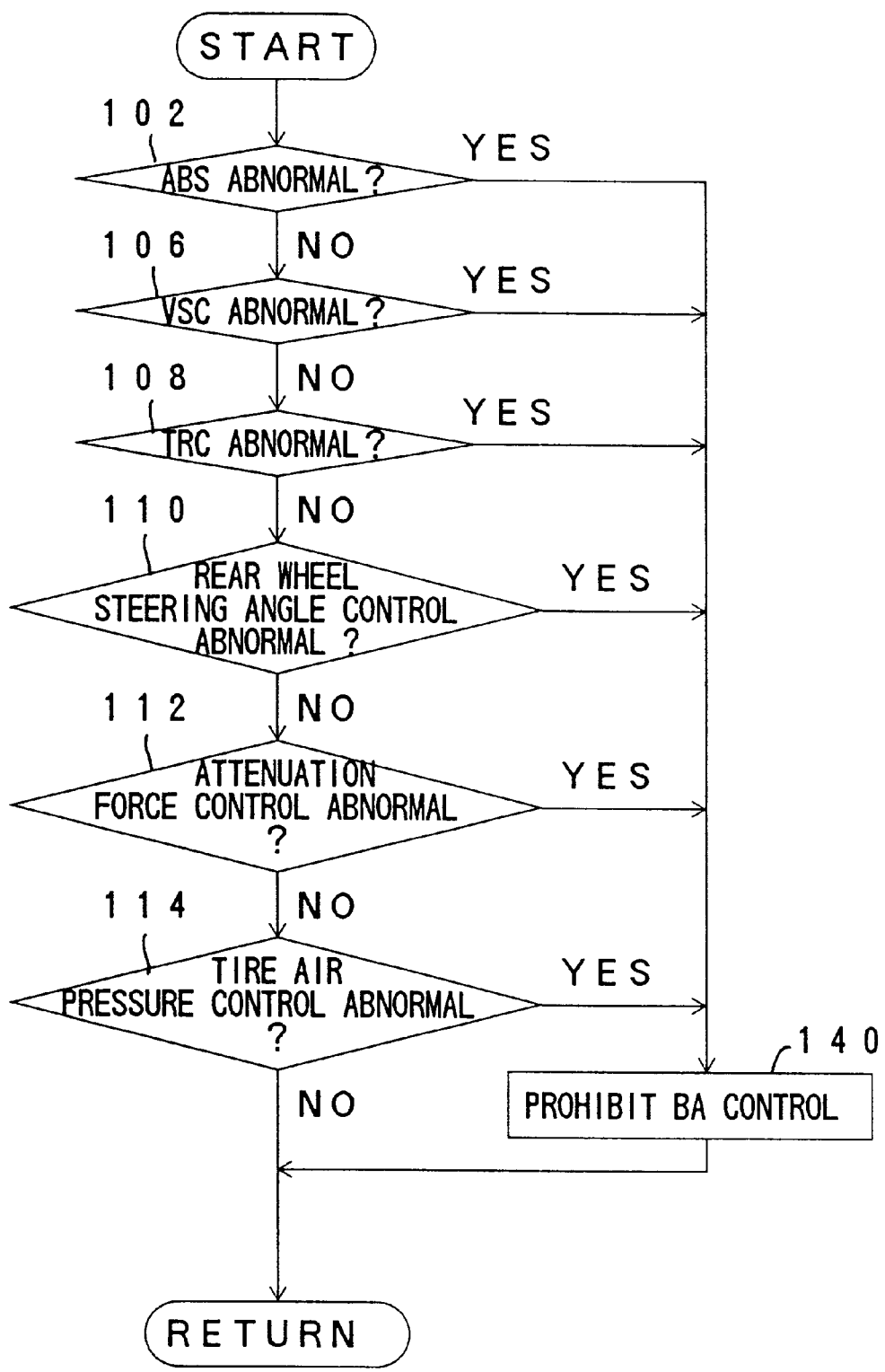
FIG. 7 is a flowchart of a routine performed in a fifth embodiment of the present invention.

A description will now be given, with reference to FIG. 7, of a fifth embodiment of the present invention. A brake force control apparatus according to the present embodiment is the same as the brake force control apparatus according to the above-mentioned first embodiment with respect to the system structure diagram shown in FIG. 1 except for the ECU 10 performing the control routine shown in FIG. 7. The brake force control apparatus according to the present embodiment has a feature in that a determination is performed as to whether or not an abnormality occurs in the vehicle characteristic changing controls, and a start of the brake assist control is prohibited if an abnormality occurs in the vehicle characteristic changing controls.

In the present routine, if it is determined, in steps 102 and 106–114, that an abnormality occurs in one of the vehicle characteristic changing controls, the process of step 140 is performed. On the other hand, if it is determined, in steps 102 and 106–114, that an abnormality does not occur in each of the vehicle characteristic changing controls, the routine at this time is ended without performing any process thereafter.

In step 140, a start of the brake assist control is prohibited. Thus, according to the brake force control apparatus of the present embodiment, the brake assist control is not started in a state in which an abnormality occurs in one of the vehicle characteristic changing controls. It should be noted that the process of step 140 is performed by resetting an execution permission flag in the routine of the brake assist control. After the process of step 140 is completed, the routine at this time is ended.

As mentioned above, according to the system of the present embodiment, when an abnormality occurs in one of the vehicle characteristic changing controls, a start of the brake assist control is prohibited. Thereby, when an abnormality occurs in the vehicle characteristic changing controls, the driving stability of the vehicle is prevented from being changed due to the execution of the brake assist control.

It should be noted that, in the present embodiment, apparatuses related to execution of the ABS control, the VSC, the TRC, the attenuation force control, the rear wheel steering angle control and the tire air pressure control correspond to the vehicle characteristic changing apparatuses. Additionally, control-prohibiting means is achieved by the ECU 10 performing the routine shown in FIG. 7.

Figure 8:
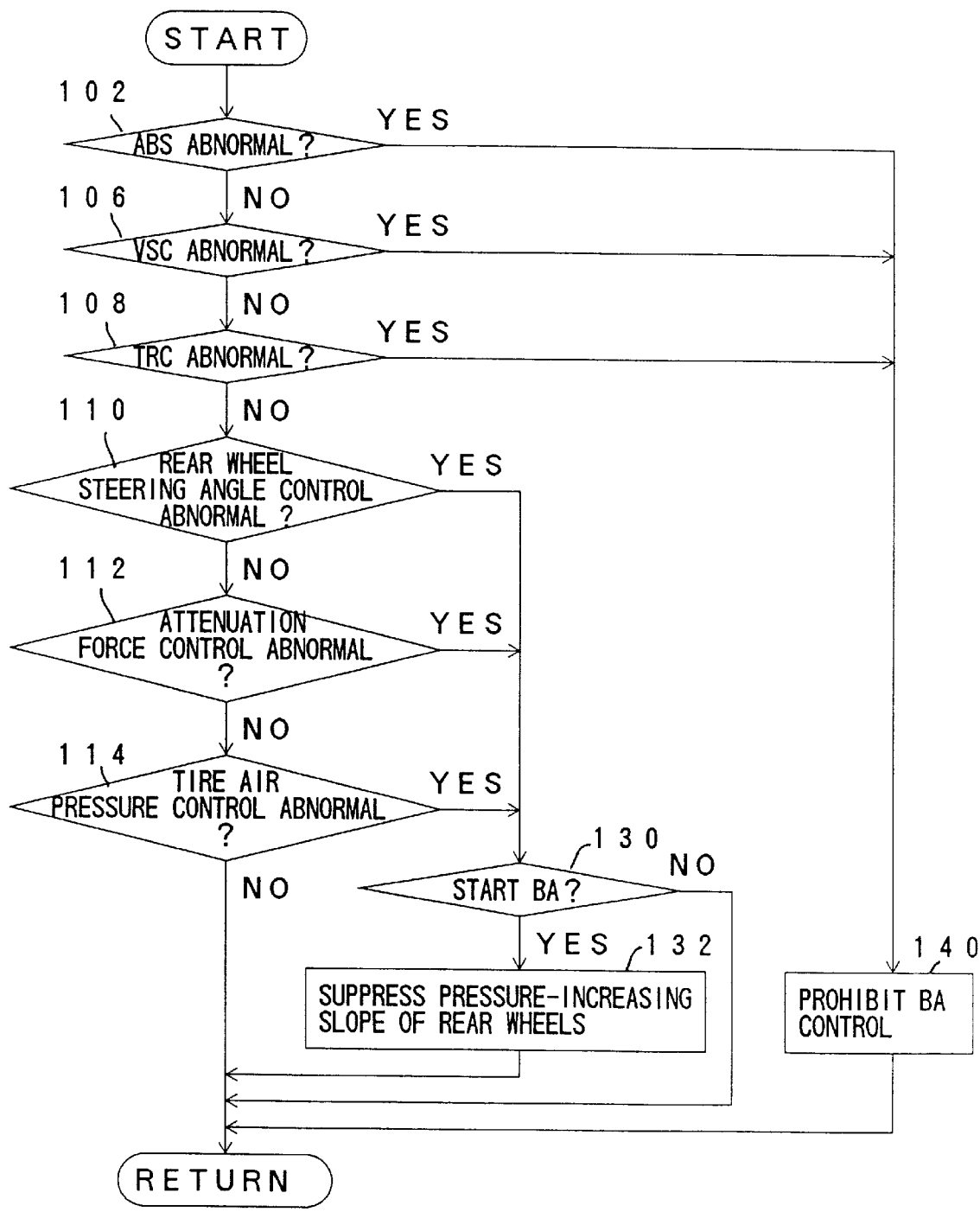
FIG. 8 is a flowchart of a routine performed in a sixth embodiment of the present invention.

A description will now be given, with reference to FIG. 8, of a sixth embodiment of the present invention. A brake force control apparatus according to the present embodiment is the same as the brake force control apparatus according to the above-mentioned first embodiment with respect to the system structure diagram shown in FIG. 1 except for the ECU 10 performing the control routine shown in FIG. 8. The brake force control apparatus according to the present embodiment has a feature in that a determination is performed as to whether or not an abnormality occurs in the vehicle characteristic changing controls, and a start of the brake assist control is prohibited when an abnormality occurs in the controls which controls the driving stability of the vehicle by controlling a brake force among vehicle characteristic changing controls, that is, when an abnormality occurs in the ABS control, the VSC and the TRC, and the pressure increasing slope of the rear wheels is controlled during the brake assist control if an abnormality occurs in the controls which control the driving stability by means other than the control of a brake force, that is, if an abnormality occurs in the rear wheel steering angle control, the attenuation force control and the tire air pressure control.

In the present routine, if it is determined, in one of steps 102, 106 and 108, that an abnormality occurs in the ABS control, the VSC or the TRC, a start of the brake assist control is prohibited in step 140. Thus, according to brake force control apparatus of the present embodiment, the brake assist control is not started in a state in which an abnormality occurs in one of the vehicle characteristic changing controls.

On the other hand, if it is determined, in one of steps 112–114, that an abnormality occurs in one of the rear wheel steering angle control, the attenuation force control and the tire air pressure control after it is determined, in one of steps 102, 106 and 108, that an abnormality does not occur in the ABS control, the VSC or the TRC, it is then determined, in step 130, whether or not a start condition of the brake assist control is established. On the other hand, if it is determined, in one of steps 112–114, that an abnormality does not occur in each of the rear wheel steering angle control, the attenuation force control and the tire air pressure control, the routine at this time is ended without performing any process thereafter.

If it is determined, in step 130, that the start condition of the brake assist control is established, the pressure increasing slope of the rear wheels during the execution of the brake assist control is reduced in step 132. After the process of step 132 is completed, the routine at this time is ended. On the other hand, if it is determined, in step 130, that the start condition of the brake assist control is not established, the routine at this time is ended without performing any process thereafter.

As mentioned above, according to the system of the present embodiment, when an abnormality occurs in one of the ABS control, the VSC and the TRC, a start of the brake assist control is prohibited. Thereby, when an abnormality occurs in the vehicle characteristic changing controls, the driving stability of the vehicle is prevented from being changed due to the execution of the brake assist control. On the other hand, when an abnormality occurs in one of the rear wheel steering angle control, the attenuation force control and the tire air pressure control, the pressure increasing slope of the rear wheels during the execution of the brake assist control is reduced.

As mentioned above, according to the system of the present embodiment, similar to the system of the third embodiment, a maintenance of the driving stability of a vehicle when an abnormality occurs in the vehicle characteristic changing controls is compatible with an increase in a brake effect according to the brake assist control.

It should be noted that, in the present embodiment, apparatuses related to execution of the ABS control, the VSC and the TRC correspond to the vehicle characteristic changing apparatuses. Additionally, control-prohibiting means is achieved by the ECU 10 performing the process of steps 102, 106, 108 and 140 of the routine shown in FIG. 8.

A description will now be given, with reference to FIG. 9, of a seventh embodiment according to the present invention.

Figure 9:
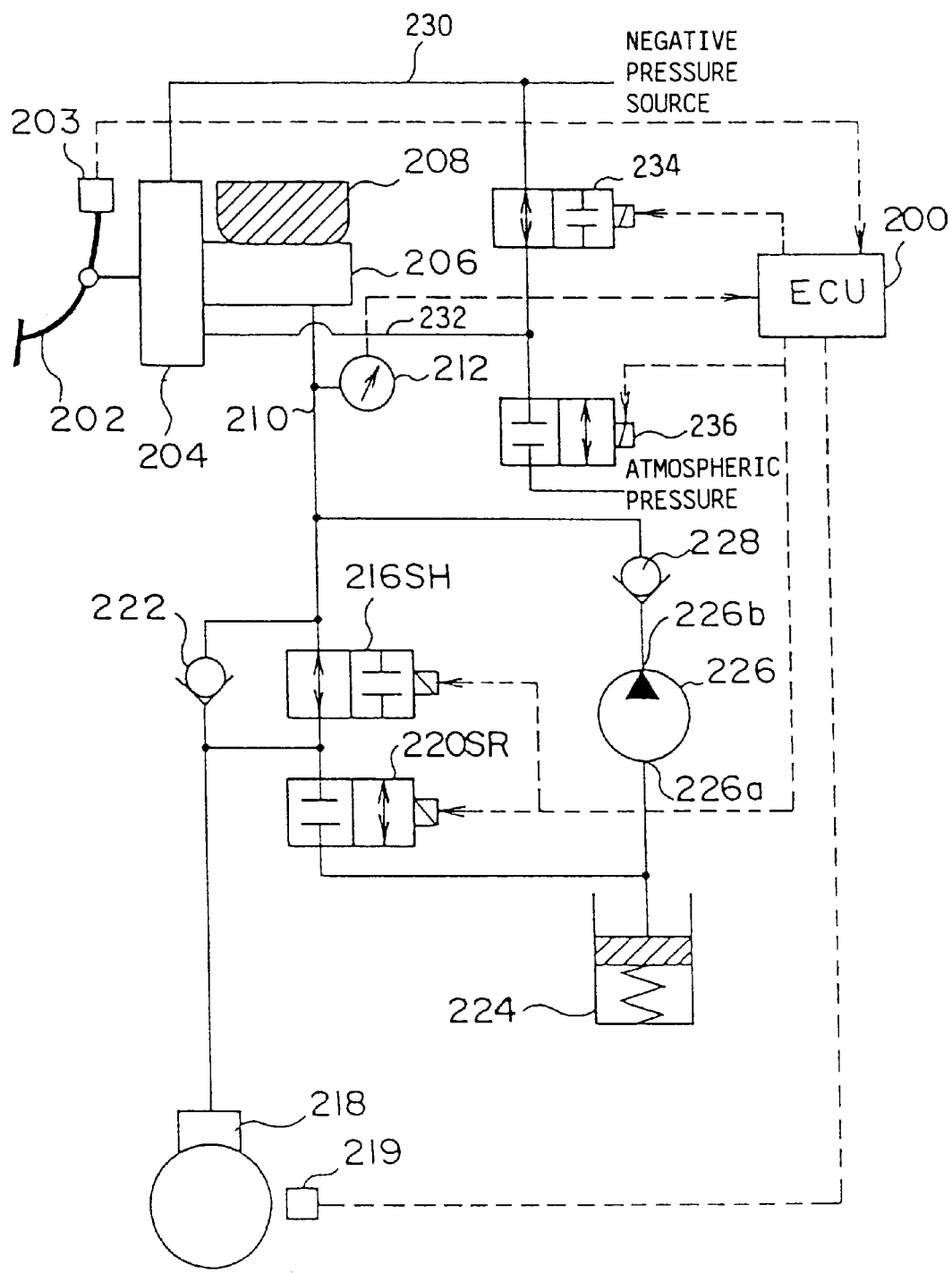
FIG. 9 is a system structure diagram of a brake force control apparatus according to a seventh embodiment of the present invention.

FIG. 9 shows a system structure diagram of a brake force control apparatus according to the present embodiment. It should be noted that, in FIG. 9, only a part of the brake force control apparatus corresponding to one wheel is shown for the sake of convenience of description.

The brake force control apparatus shown in FIG. 6 is controlled by an ECU 200. The brake force control apparatus according to the present embodiment has a brake pedal 202. A brake switch 203 is provided near the brake pedal 202. The brake switch 203 is a switch which generates an ON output when the brake pedal 202 is pressed. The output signal of the brake switch 203 is supplied to the ECU 200. The ECU 200 determines whether or not a braking operation is being performed based on the output signal of the brake switch 203.

The brake pedal 202 is connected to a vacuum booster 204. The vacuum booster 204 is an apparatus which assists a brake pressing force by using an intake negative pressure of an internal combustion engine as a power source. A master cylinder 206 is fixed to the vacuum booster 204. The vacuum booster 204 transmits a resultant force of the brake pressing force $F_P$ which is applied to the brake pedal 206 and the brake assist force $F_A$ which is generated by itself to the master cylinder 206.

The master cylinder 206 has a fluid pressure chamber therein. Additionally, a reservoir tank 208 is provided above the master cylinder 206. The fluid pressure chamber of the master cylinder and the reservoir tank 208 communicate with each other when a press of the brake pedal 202 is released, whereas they are disconnected from each other when the brake pedal is pressed. Accordingly, brake fluid is supplied to the fluid pressure chamber each time the press of the brake pedal 202 is released.

The fluid pressure chamber of the maser cylinder 206 communicates with a fluid pressure passage 210. The fluid pressure passage 210 is provided with a hydraulic pressure sensor 212 which outputs an electric signal corresponding to a pressure inside the fluid pressure passage 210. The output signal of the hydraulic pressure sensor 212 is supplied to the ECU 200. The ECU 200 detects a fluid pressure generated by the master cylinder 206, that is, the master cylinder pressure Im/c based on the output signal of the hydraulic pressure sensor 212.

The fluid pressure passage 210 is provided with a holding solenoid 216 (hereinafter, referred to as SH 216). The SH 216 is a two-position solenoid valve which maintains an open state in a normal state (OFF state). The SH 216 is set to be in an ON state (closed state) by a drive signal being supplied by the ECU 200.

The downstream side of the SH 216 communicates with a wheel cylinder 218 and a pressure decreasing solenoid 220 (hereinafter, referred to as SR220). The SR 220 is a two-position solenoid valve which maintains a closed state in a normal state (OFF state). SR 220 is set to be in an ON state (open state) by a drive signal being supplied by the ECU 200. Additionally, a check valve 222 which permits a fluid flow only in a direction from the wheel cylinder 218 to the fluid pressure passage 210 is provided between the wheel cylinder 218 and the fluid pressure passage 210.

A wheel speed sensor 219 which generates a pulse signal each time the wheel rotates a predetermined angle is provided near the wheel cylinder 218. An output signal of the wheel speed sensor 219 is supplied to the ECU 200. The ECU 200 detects a wheel speed based on the output signal of the wheel speed sensor 219.

A reservoir 224 is provided on the downstream side of the SR 220. The brake fluid flowing out of the SR 220 when the SR 220 is set to be in the ON state (open state) is stored in the reservoir 224. It should be noted that the reservoir previously stores a predetermined amount of brake fluid. The reservoir 224 communicates with an inlet port 226a of a pump 226. Additionally, an outlet port 226b of the pump 226 communicates with the fluid pressure passage 210 via a check valve 228. The check vale 228 is a one-way valve which permits a fluid flow only in a direction from the pump 226 to the fluid pressure passage 210.

The vacuum booster 204 communicates with a negative pressure passage 230 and a pressure adjusting passage 234. The negative pressure passage 230 communicates with a negative pressure source such as an intake system of an internal combustion engine. On the other hand, the pressure adjusting passage 232 communicates with a negative pressure introducing valve 234 and an atmospheric pressure introducing valve 236. The negative pressure introducing valve 234 is a two-position solenoid valve located between the pressure adjusting passage 232 and the negative pressure passage 230, and maintains an open state ins a normal state (OFF state). On the other hand, the atmospheric pressure introducing valve 236 is a two-position solenoid valve which controls a communication between the pressure adjusting passage 232 and an atmosphere, and maintains a closed state in a normal state (OFF state). The negative pressure introducing valve 234 and the atmospheric pressure introducing valve 236 are caused to be an ON state (closed state or open state) by drive signals being supplied from the ECU 200.

The vacuum booster 204 has a negative pressure chamber and a pressure changing chamber separated from each other by a diaphragm therein. The negative pressure chamber communicates with the negative pressure passage 230, and is maintained at a predetermined negative pressure during an operation of the vehicle. The pressure-changing chamber communicates with the pressure adjusting passage 232 and an atmospheric space via a valve mechanism which adjusts a pressure inside the pressure-changing chamber. The valve mechanism associates with an operation of the brake pedal 202, and operates as follows.

When a negative pressure is introduced into the pressure adjusting passage 232, the valve mechanism causes the pressure changing chamber to communicate with the atmospheric space until a pressure difference corresponding to the brake pressing force $F_P$ is generated between the pressure changing chamber and the negative pressure chamber. In this case, an urging force corresponding to the pressure difference between the pressure changing chamber and the negative pressure chamber, that is, the urging force corresponding to the brake pressing force $F_P$ is exerted on the diaphragm. The vacuum booster 204 transmits the urging force to the master cylinder 206 as the brake assist force $F_A$. Additionally, the valve mechanism introduces an atmospheric pressure to the pressure changing chamber irrespective of the brake pressing force $F_P$ when the atmospheric pressure is introduced into the pressure adjusting passage 232. In this case, an urging force corresponding to a pressure difference between a pressure inside the negative pressure chamber and the atmospheric pressure is exerted on the diaphragm, and a maximum brake assist force $F_{MAX}$ is generated by the vacuum booster.

A description will now be given of an operation of the brake force control apparatus according to the present embodiment. In the system according to the present embodiment, when the ECU 200 performs the normal control, both the negative pressure introducing valve 234 and the atmospheric pressure introducing valve 236 are maintained to be the OFF state. In this case, the vacuum booster 204 generates the brake assist force $F_A$ corresponding to the brake pressing force FE as mentioned above. As a result, a resultant force of the brake pressing force $F_P$ and the brake assist force $F_A$ is transmitted to the master cylinder 206.

When the resultant force of the brake assist force $F_A$ and the brake pressing force $F_P$ is transmitted to the master cylinder 206, the master cylinder 206 generates a master cylinder pressure $P_{M/C}$ having a predetermined power ratio with respect to the brake pressing force $F_P$.

The ECU 200 turns off the SH 216 and SR 220 and maintains the pump 226 at a stopped state when a state of the vehicle is stable. When the hydraulic circuit is set to the normal state, the master cylinder pressure $P_{M/C}$ is introduced into the wheel cylinder 218 as it is. Accordingly, the brake force generated in the wheel cylinder 218 is adjusted to a level corresponding to the brake pressing force $F_P$.

If a slip rate S of a wheel exceeds a predetermined value after the braking operation is started, the ECU 200 starts the ABS control similar to the ECU 10 of the above-mentioned first embodiment. The ABS control is achieved by driving the SH 216 and the SR 220 while operating the pump 226 as mentioned below when the brake pedal 202 is pressed, that is, when the master cylinder pressure $P_{M/C}$ is appropriately increased.

When an appropriately increased master cylinder pressure $P_{M/C}$ is output from the master cylinder 204, the SH 216 is set to the open state and the SR 220 is set to the closed state, and, thereby, the wheel cylinder pressure $P_{W/C}$ is increased with the master cylinder pressure $P_{M/C}$ as an upper limit value. Hereinafter, this state is referred to as a pressure-increasing mode. Additionally, in the same circumstances, the wheel cylinder pressure $P_{W/C}$ is maintained without being increased or decreased by the SH 216 being set to the closed state and the SR 220 being set to the closed state. Additionally, the wheel cylinder pressure $P_{W/C}$ can be decreased by the SH 216 being set to the open state and the SR 220 being set to the open state. Hereinafter, these states are referred to as a holding mode ② and a pressure decreasing mode ③, respectively. The ECU 200 achieves, if necessary, the above-mentioned pressure increasing mode ①, holding mode ② and pressure-decreasing mode ③ so that a slip rate S of the wheel becomes an appropriate value.

When a depression of the brake pedal 202 is released by the driver during execution of the ABS control, the wheel cylinder pressure $P_{W/C}$ must be immediately decreased. In the system according to the present embodiment, the check valve 222 is provided in the hydraulic circuit corresponding to the wheel cylinder 218. The check valve 222 permits a fluid flow only in the direction from the wheel cylinder 218 to the master cylinder 206. Thus, according to the system of the present embodiment, the wheel cylinder pressure $P_{W/C}$ of the wheel cylinder 222 can be immediately decreased after the depression of the brake pedal 202 is released.

In the system according to the present embodiment, when the ABS control is performed, the wheel cylinder pressure $P_{W/C}$ is increased by the master cylinder 206 as a fluid pressure source. Additionally, the wheel cylinder pressure $P_{W/C}$ is decreased by having the brake fluid in the wheel cylinder flow to the reservoir 224. Accordingly, if the pressure-increasing mode and the pressure-decreasing mode are repeatedly performed, the brake fluid in the master cylinder 206 gradually flows to the reservoir 224. However, in the system according to the present embodiment, the brake fluid in the reservoir 224 is delivered to the master cylinder 206 by the pump 226. Thus, if the ABS control is continued for a long time, a so-called bottoming of the master cylinder does not occur.

A description will now be given of an operation achieved by the ECU 200 performing the brake assist control. The brake assist control is achieved by turning on both the negative pressure introducing valve 234 and the atmospheric pressure introducing valve 236, that is, by closing the negative pressure introducing valve 234 and opening the atmospheric pressure introducing valve 236.

When the brake assist control is started in the system of the present embodiment, an atmospheric air is introduced into the pressure adjusting passage 232. As mentioned above, when an atmospheric air is introduced into the pressure adjusting passage 232, the vacuum booster 204 generates a maximum brake assist force $F_{AMAX}$. Accordingly, after the brake assist control is started, a resultant force of the maximum brake assist force $F_{AMAX}$ and the brake pressing force $F_P$ is transmitted to the master cylinder 206.

After the execution condition of the brake assist control is established and until the execution condition of the ABS control is established, the ECU 200 causes the hydraulic circuit connected to the master cylinder 206 to be a normal state. In this case, the master cylinder pressure $P_{M/C}$ is introduced into the wheel cylinder 218. Accordingly, the wheel cylinder pressure $P_{W/C}$ is rapidly increased from a pressure corresponding to "$F_A+F_P$" to a pressure corresponding to "$F_{AMAX}+F_P$" when the brake assist control is started.

As mentioned above, according to the system of the present embodiment, when an emergency braking operation is performed, the wheel cylinder pressure $P_{W/C}$ can be increased to a sufficiently large value as compared to the brake pressing force $F_P$. Thus, according to the system of the present embodiment, a large brake force can be generated immediately after a condition in which an emergency braking is required occurs even if the driver is a beginner-grade driver.

In the system according to the present embodiment, a period during which a brake pressing force $F_P$ is applied to the brake pedal 202 after the brake assist control is started, the master cylinder pressure $P_{M/C}$ is maintained to a pressure corresponding to "$F_{AMAX}+F_P$". On the other hand, when a depression of the brake pedal 202 is released after the brake assist control is started, the master cylinder pressure $P_{M/C}$ is decreased to a pressure corresponding to "$F_{AMAX}$".

Accordingly, by monitoring the output signal of the master cylinder pressure $P_{M/C}$ detected by the hydraulic pressure sensor 212, the ECU 200 can determine whether or not the depression of the brake pedal 202 is released. Upon detection of the release of the depression of the brake pedal 202, the ECU 200 stops supply of the drive signals to the negative pressure introducing valve 234 and the atmospheric pressure introducing valve 236, and terminates the brake assist control.

In the brake force control apparatus of the present embodiment, similar to the brake force control apparatus shown in FIG. 1, the ECU 200 concurrently performs routines of the ABS control, the VSC and the TRC. Additionally, the brake force control apparatus according to the present embodiment is provided to a vehicle having a control apparatus which performs the attenuation force control, the rear wheel steering angle control and the tire air pressure control. If the brake assist control is performed in a state in which an abnormality occurs in one of these vehicle characteristic changing controls, it is possible that the a change in the driving stability becomes large, similar to the case of the brake force control apparatus shown in FIG. 1. However, in the system according to the present embodiment, similar to the above-mentioned first embodiment to the above-mentioned sixth embodiment, when an abnormality occurs in the vehicle characteristic changing controls, a change in the driving stability of the vehicle due to the execution of the brake assist control can be suppressed to be small by performing the routines shown in FIG. 3 to FIG. 8 by the ECU 200.

It should be noted that, in the above-mentioned first to sevenths embodiments, although the ABS control, the VSC, the TRC, the attenuation control, the rear wheel steering angle control and the tire air pressure control are performed as a control for maintaining a driving stability of a vehicle, the present invention is not limited to this and can be effectively applied a case in which a conventionally known, arbitrary control is performed for the purpose of maintaining a driving stability of a vehicle.

The present invention is not limited to the specifically disclosed embodiments, and variations and modifications may be made without departing from the scope of the present invention.

What is claimed is:

1. A brake force control apparatus adapted to be provided on a vehicle having a vehicle characteristic changing apparatus for controlling a driving stability of the vehicle, the brake force control apparatus performing a normal control for generating a brake force corresponding to a brake pressing force and a brake assist control for increasing a ratio of a brake force to a pressing force applied to a brake pedal to be larger than that of the normal control when an operational state of the brake pedal satisfies a predetermined condition, comprising:

pressure increasing slope controlling means for decreasing an increasing slope of a brake force of at least rear wheels among front and rear wheels of said vehicle so that the increasing slope becomes smaller than that achieved during a normal time of the vehicle characteristic changing apparatus when the operational state of the brake pedal satisfies the predetermined condition and when an abnormality occurs in said vehicle characteristic changing apparatus.

2. A brake force control apparatus adapted to be provided on a vehicle having a vehicle characteristic changing apparatus for controlling a driving stability of the vehicle, the brake force control apparatus performing a normal control for generating a brake force corresponding to a brake pressing force and a brake assist control for increasing a ratio of a brake force to a pressing force applied to a brake pedal to be larger than that of the normal control when an operational state of the brake pedal satisfies a predetermined condition, comprising:

control prohibiting means for prohibiting an execution of said brake assist control when an abnormality occurs in said vehicle characteristic changing apparatus regardless of whether or not the operational state of the brake pedal satisfies the predetermined condition.

3. A brake force control apparatus adapted to be provided on a vehicle having a vehicle characteristic changing apparatus for controlling a driving stability of the vehicle by controlling a brake force, the brake force control apparatus performing a normal control for generating a brake force corresponding to a brake pressing force and a brake assist control for increasing a ratio of a brake force to a pressing force applied to a brake pedal to be larger than that of the normal control when an operational state of the brake pedal satisfies a predetermined condition, comprising:

control prohibiting means for prohibiting an execution of said brake assist control when an abnormality occurs in said vehicle characteristic changing apparatus regardless of whether or not the operational state of the brake pedal satisfies the predetermined condition.

4. A brake force control apparatus adapted to be provided on a vehicle having a vehicle characteristic changing apparatus for controlling a driving stability of the vehicle, the brake force control apparatus performing a normal control for generating a brake force corresponding to a brake pressing force and a brake assist control for increasing a ratio of a brake force to a pressing force applied to a brake pedal to be larger than that of the normal control when an operational state of the brake pedal satisfies a predetermined condition, comprising:

brake assist control terminating means for terminating an execution of said brake assist control and executing the normal control when an abnormality occurs in said vehicle characteristic changing apparatus during execution of the brake assist control.

5. A brake force control apparatus adapted to be provided on a vehicle having a plurality of vehicle characteristic changing apparatuses for controlling a driving stability of the vehicle, the brake force control apparatus performing a normal control for generating a brake force corresponding to a brake pressing force and a brake assist control for increasing a ratio of a brake force to a pressing force applied to a brake pedal to be larger than that of the normal control when an operational state of the brake pedal satisfies a predetermined condition, comprising:

brake assist control terminating means for terminating an execution of said brake assist control and executing the normal control when an abnormality occurs in said vehicle characteristic changing apparatuses associated with a control of a brake force during the execution of the brake assist control; and pressure increasing slope controlling means for decreasing an increasing slope of a brake force of at least rear wheels among front and rear wheels of said vehicle so that the increasing slope becomes smaller than that achieved during a normal time of the vehicle characteristic changing apparatuses when the operational state of the brake pedal satisfies the predetermined condition and when an abnormality occurs in said vehicle characteristic changing apparatuses other than that associated with the control of the brake force.

6. A brake force control apparatus adapted to be provided on a vehicle having a vehicle characteristic changing apparatus for controlling a driving stability of the vehicle, the brake force control apparatus performing a normal control for generating a brake force corresponding to a brake pressing force and a brake assist control for increasing a ratio of a brake force to a pressing force applied to a brake pedal to be larger than that of the normal control when an operational state of the brake pedal satisfies a predetermined condition, comprising:

abnormality detecting means for detecting an abnormality of said vehicle characteristic changing apparatus;

brake assist control start determining means for determining a start of an execution of the brake assist control; and pressure increasing slope controlling means for decreasing an increasing slope of a brake force of at least rear wheels among front and rear wheels of said vehicle so that the increasing slope becomes smaller than that achieved during a normal time of the vehicle characteristic changing apparatus when an abnormality of said vehicle characteristic changing apparatus is detected and when the brake assist control is started.

7. A brake force control apparatus adapted to be provided on a vehicle having a plurality of vehicle characteristic changing apparatuses for controlling a driving stability of the vehicle, the brake force control apparatus performing a normal control for generating a brake force corresponding to a brake pressing force and a brake assist control for increasing a ratio of a brake force to a pressing force applied to a brake pedal to be larger than that of the normal control when an operational state of the brake pedal satisfies a predetermined condition, comprising:

abnormality detecting means for detecting an abnormality of each of said vehicle characteristic changing apparatuses;

brake assist control start determining means for determining a start of an execution of the brake assist control; and pressure increasing slope controlling means for decreasing an increasing slope of a brake force of at least rear wheels among front and rear wheels of said vehicle so that the increasing slope becomes smaller than that achieved during a normal time of the vehicle characteristic changing apparatuses when an abnormality is detected in said vehicle characteristic changing apparatuses other than that associated with a control of the brake force and when the brake assist control is started.

* * * * *

UNITED STATES PATENT AND TRADEMARK OFFICE
CERTIFICATE OF CORRECTION

PATENT NO. : 6,280,008 B1
DATED : August 28, 2001
INVENTOR(S) : Hiroaki Yoshida

It is certified that error appears in the above-identified patent and that said Letters Patent is hereby corrected as shown below:

<u>Title page,</u>
Item [30], change the Foreign Application Priority Data, as follows:
-- Apr. 26, 1996 (JP)................... 8-108184 --

<u>Column 1,</u>
Line 4, change "a. brake" to -- a brake --.

<u>Column 7,</u>
Line 4, change "C)n" to -- On --.

<u>Column 23,</u>
Line 34, change "maser" to -- master --.

<u>Column 24,</u>
Line 7, change "vale 228" to -- valve 228 --.
Line 20, change "ins" to -- in --.

<u>Column 25,</u>
Line 1, change "be the OFF state" to -- be in the OFF state. --.

<u>Column 27,</u>
Line 11, change "sevenths" to -- seventh --.

Signed and Sealed this

Twenty-third Day of March, 2004

JON W. DUDAS
*Acting Director of the United States Patent and Trademark Office*